(12) United States Patent
MacDonald et al.

(10) Patent No.: US 11,766,832 B2
(45) Date of Patent: Sep. 26, 2023

(54) SYSTEM AND METHOD FOR ADDITIVELY MANUFACTURING AN OBJECT

(71) Applicant: The Boeing Company, Chicago, IL (US)

(72) Inventors: Elaine MacDonald, Wildwood, MO (US); Daniel J. Braley, St. Peters, MO (US)

(73) Assignee: The Boeing Company, Arlington, VA (US)

(*) Notice: Subject to any disclaimer, the term of this patent is extended or adjusted under 35 U.S.C. 154(b) by 536 days.

(21) Appl. No.: 15/930,572

(22) Filed: May 13, 2020

(65) Prior Publication Data

US 2021/0354397 A1    Nov. 18, 2021

(51) Int. Cl.
| | |
|---|---|
| *B29C 64/40* | (2017.01) |
| *B33Y 10/00* | (2015.01) |
| *B33Y 30/00* | (2015.01) |
| *B33Y 50/02* | (2015.01) |
| *B29C 64/153* | (2017.01) |
| *B29C 64/393* | (2017.01) |
| *B29C 64/218* | (2017.01) |
| *B29C 64/165* | (2017.01) |

(Continued)

(52) U.S. Cl.
CPC ............ *B29C 64/40* (2017.08); *B22F 10/34* (2021.01); *B22F 12/58* (2021.01); *B29C 64/153* (2017.08); *B29C 64/165* (2017.08); *B29C 64/209* (2017.08); *B29C 64/218* (2017.08); *B29C 64/336* (2017.08); *B29C 64/393* (2017.08); *B33Y 10/00* (2014.12); *B33Y 30/00* (2014.12); *B33Y 40/00* (2014.12); *B33Y 50/02* (2014.12); *B22F 2207/01* (2013.01)

(58) Field of Classification Search
CPC ..... B29C 64/153; B29C 64/40; B29C 64/336; B22F 12/58; B22F 2207/01; B22F 10/34
See application file for complete search history.

(56) References Cited

U.S. PATENT DOCUMENTS 5,126,529 A  *  6/1992  Weiss ................... B33Y 10/00
                                                      118/313
5,216,616 A  *  6/1993  Masters ................ B29C 64/40
                                                       700/118

(Continued)

FOREIGN PATENT DOCUMENTS

WO    WO-2018102739 A1  *  6/2018  .......... B22D 11/01
WO    WO 2018/197876        11/2018

OTHER PUBLICATIONS

European Patent Office, Extended European Search Report, App. No. 21161858.2 (dated Aug. 25, 2021).

(Continued)

*Primary Examiner* — Atul P. Khare
(74) *Attorney, Agent, or Firm* — Waiters & Wasylyna LLC

(57) ABSTRACT

A method of additively manufacturing an object includes steps of: (1) selectively depositing build powder inside of a build contour of the object to form a build-powder section of a powder layer; and (2) selectively depositing support powder outside of the build contour to form a support-powder section of the powder layer. According to the method, the build powder includes a build-powder composition, the support powder includes a support-powder composition, and the build-powder composition and the support-powder composition are different.

20 Claims, 17 Drawing Sheets

(51) Int. Cl.
 B33Y 40/00 (2020.01)
 B29C 64/209 (2017.01)
 B29C 64/336 (2017.01)
 B22F 10/34 (2021.01)
 B22F 12/58 (2021.01)
 B33Y 80/00 (2015.01)

(56) References Cited

U.S. PATENT DOCUMENTS

| | | | |
|---|---|---|---|
| 5,555,481 A | 9/1996 | Rock et al. | |
| 7,045,738 B1* | 5/2006 | Kovacevic | B29C 64/329 |
| | | | 219/121.64 |
| 9,101,979 B2 | 8/2015 | Hofmann et al. | |
| 10,328,525 B2* | 6/2019 | Gillespie | B23K 15/0086 |
| 10,406,748 B2* | 9/2019 | Honda | B33Y 50/02 |
| 10,583,481 B2* | 3/2020 | Blanchet | B33Y 10/00 |
| 11,040,486 B2* | 6/2021 | Kimblad | B22F 1/107 |
| 11,148,358 B2* | 10/2021 | Oppenheimer | B33Y 40/00 |
| 11,390,020 B2* | 7/2022 | Achten | B29C 64/371 |
| 2002/0029094 A1* | 3/2002 | Koreishi | B22F 10/38 |
| | | | 700/118 |
| 2014/0099476 A1 | 4/2014 | Subramanian et al. | |
| 2016/0001365 A1* | 1/2016 | Blanchet | B22F 5/003 |
| | | | 700/97 |
| 2016/0074938 A1* | 3/2016 | Kitani | B22F 3/003 |
| | | | 219/76.12 |
| 2017/0072471 A1 | 3/2017 | Welch et al. | |
| 2017/0165910 A1* | 6/2017 | Dinardo | B33Y 10/00 |
| 2019/0030608 A1 | 1/2019 | Ott et al. | |
| 2019/0240902 A1 | 8/2019 | Bedoret et al. | |
| 2020/0079028 A1* | 3/2020 | Miller | B29C 64/40 |
| 2020/0114427 A1* | 4/2020 | Karuppoor | B29C 64/209 |
| 2020/0122393 A1* | 4/2020 | Madelone, Jr. | B29C 64/00 |
| 2020/0189001 A1* | 6/2020 | Zhang | B22F 12/67 |
| 2020/0362462 A1* | 11/2020 | Braley | C23C 24/087 |

OTHER PUBLICATIONS

Joris Peels: "Interview with Kevin Eokes of Selective Powder Deposition Firm Aerosint," 3D Printing, Exclusive Interviews, https://3dprint.cm/229431/interview-with-Kevin-eckes-of-selective-powder-deposition-firm-aerosint/ (Nov. 8, 2018).

* cited by examiner

SYSTEM AND METHOD FOR ADDITIVELY MANUFACTURING AN OBJECT

FIELD

The present disclosure relates generally to additive manufacturing and, more particularly, to systems and methods for powder-bed additively manufacturing and, more particularly, to powder-bed additively manufacturing systems and methods used to make an object having a compositional gradient.

BACKGROUND

Additive manufacturing, also referred to as layered manufacturing and 3D printing, is a process of joining materials to make objects as opposed to subtractive manufacturing. Additive manufacturing has a wide variety of applications from rapid prototyping to fabrication of end-use products. On a basic level, additive manufacturing technologies are based on the concept of building up material in a cross-sectional, layer-by-layer manner to form a 3D object. Common to additive manufacturing technologies is the use of 3D modeling software (Computer Aided Design or CAD), machine equipment, and layering material. Once a CAD model is produced, the machine equipment reads in data from the CAD file and uses successive layers of a desired layering material to fabricate the 3D object.

One category of additive manufacturing is powder bed additive manufacturing. Powder bed additive manufacturing employs a powder bed to join layers of powder in additive steps to produce the 3D object. In powder bed additive manufacturing, a layer of powder in the powder bed is joined to an underlying layer of the object to add a new layer to the object. A new layer of powder is deposited in the powder bed and over the previously formed layer of the object, and the new layer of powder is similarly joined to the object. The depositing-and-joining procedure is repeated a number of times to produce a plurality of layers on the object to, ultimately, form the object.

Additive manufacturing has certain advantages over traditional manufacturing techniques. Unlike traditional manufacturing techniques, additive manufacturing provides increased design freedom and is not limited by geometric constraints. Additive manufacturing may also simplify and reduce the costs associated with manufacturing an object as compared to traditional manufacturing techniques. However, additive manufacturing has some disadvantages. For example, in powder bed additive manufacturing, a large amount of powder in the powder bed is not used to form the object. This unused powder either accounts for wasted material or must be collected and recycled. Additionally, conventional powder bed additive manufacturing techniques may not be suited to manufacture an object that has a compositional gradient. Accordingly, those skilled in the art continue with research and development efforts to provide improved additive manufacturing techniques, such as powder bed additive manufacturing.

SUMMARY

The following is a non-exhaustive list of examples, which may or may not be claimed, of the subject matter according to the present disclosure.

In an example, a disclosed method of additively manufacturing an object includes steps of: (1) selectively depositing build powder inside of a build contour of the object to form a build-powder section of a powder layer; and (2) selectively depositing support powder outside of the build contour to form a support-powder section of the powder layer. According to the method, the build powder includes a build-powder composition, the support powder includes a support-powder composition, and the build-powder composition and the support-powder composition are different.

In an example, a disclosed method of additively manufacturing an object includes steps of: (1) selectively depositing build powder inside of a build contour of the object to form a build-powder section of a powder layer; (2) selectively varying the build-powder composition of the build powder to achieve a powder gradient within the build-powder section of the powder layer; and (3) selectively depositing support powder outside of the build contour to form a support-powder section of the powder layer. According to the method, the build powder includes a build-powder composition, the support powder includes a support-powder composition, and the build-powder composition and the support-powder composition are different.

In an example, a disclosed additive-manufacturing system includes a powder-deposition apparatus configured to selectively deposit build powder inside of a build contour to form a build-powder section of a powder layer and selectively deposit support powder outside of the build contour to form a support-powder section of the powder layer. The build powder includes a build-powder composition. The support powder includes a support-powder composition. The build-powder composition and the support-powder composition are different.

Other examples of the disclosed system and method will become apparent from the following detailed description, the accompanying drawings, and the appended claims.

DETAILED DESCRIPTION

Figure 1:
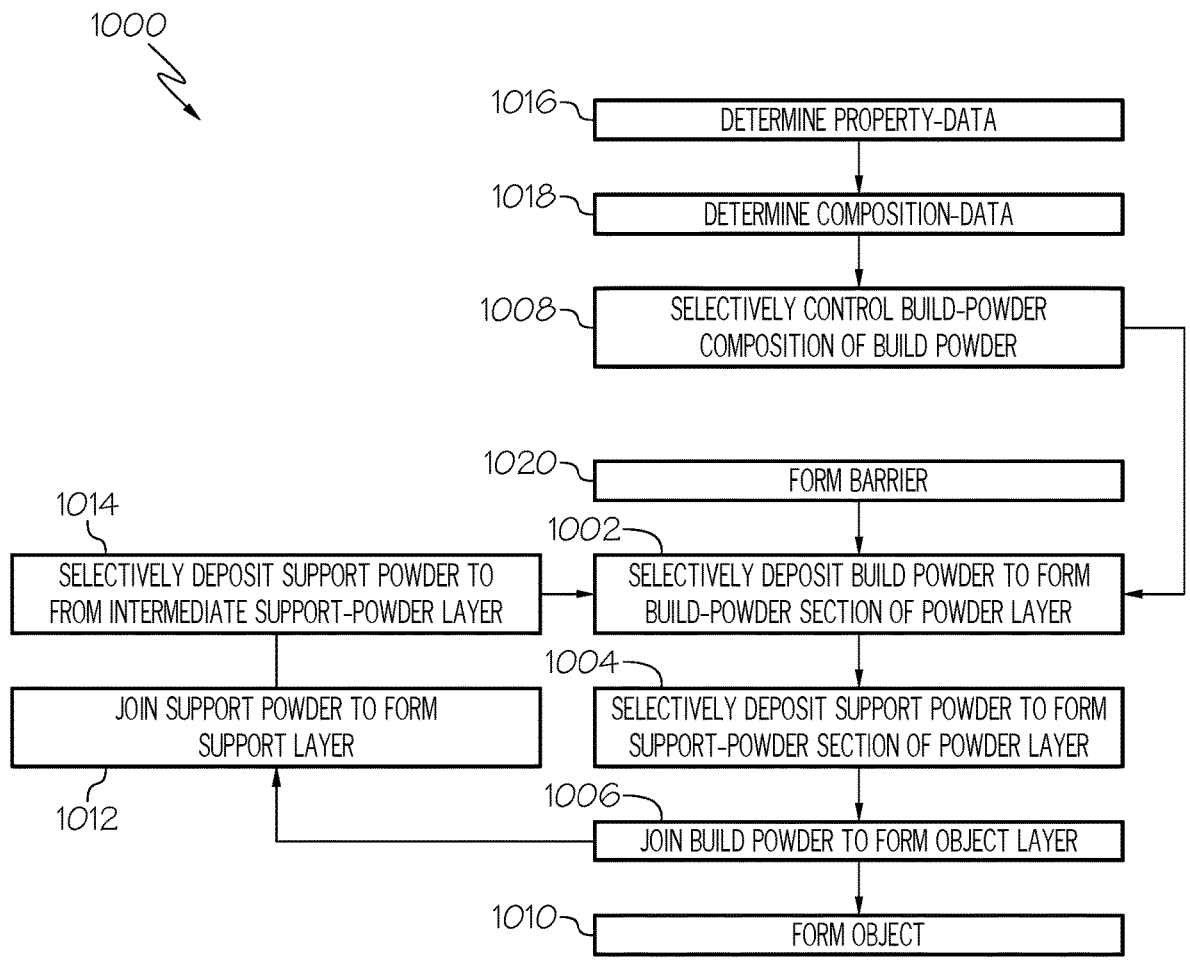
FIG. 1 is a flow diagram of an example of a method of additively manufacturing an object.

The following detailed description refers to the accompanying drawings, which illustrate specific examples of the subject matter disclosed herein. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter disclosed herein are provided below. Reference herein to "example" means that one or more feature, structure, element, component, characteristic, and/or operational step described in connection with the example is included in at least one aspect, embodiment, and/or implementation of the subject matter disclosed herein. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Referring generally to FIGS. 1-28, by way of examples, the present disclosure is directed to a method 1000 of additively manufacturing an object 100 and an additive manufacturing system 200 used to additively manufacture the object 100. According to one or more examples, the method 1000 utilizes the additive manufacturing system 200. In particular, the method 1000 and the additive manufacturing system 200 are implementations of a powder bed additive manufacturing process used to make the object 100.

The object 100 refers to an object made using the additive manufacturing system 200 and method 1000 and includes any article, part, component, or other three-dimensional structure that is manufacturing by the powder bed additive manufacturing process.

Figure 2:
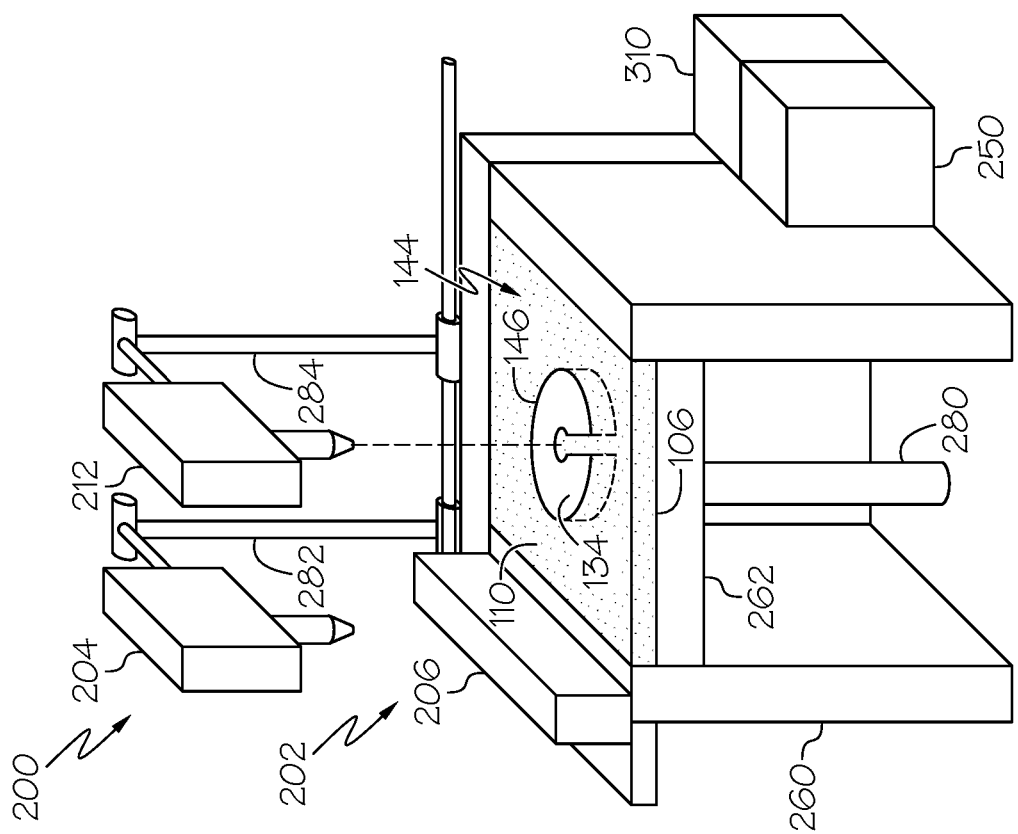
FIG. 2 is a schematic illustration of an example of an additive manufacturing system, in which a powder layer is formed by build powder and support powder.
Figure 3:
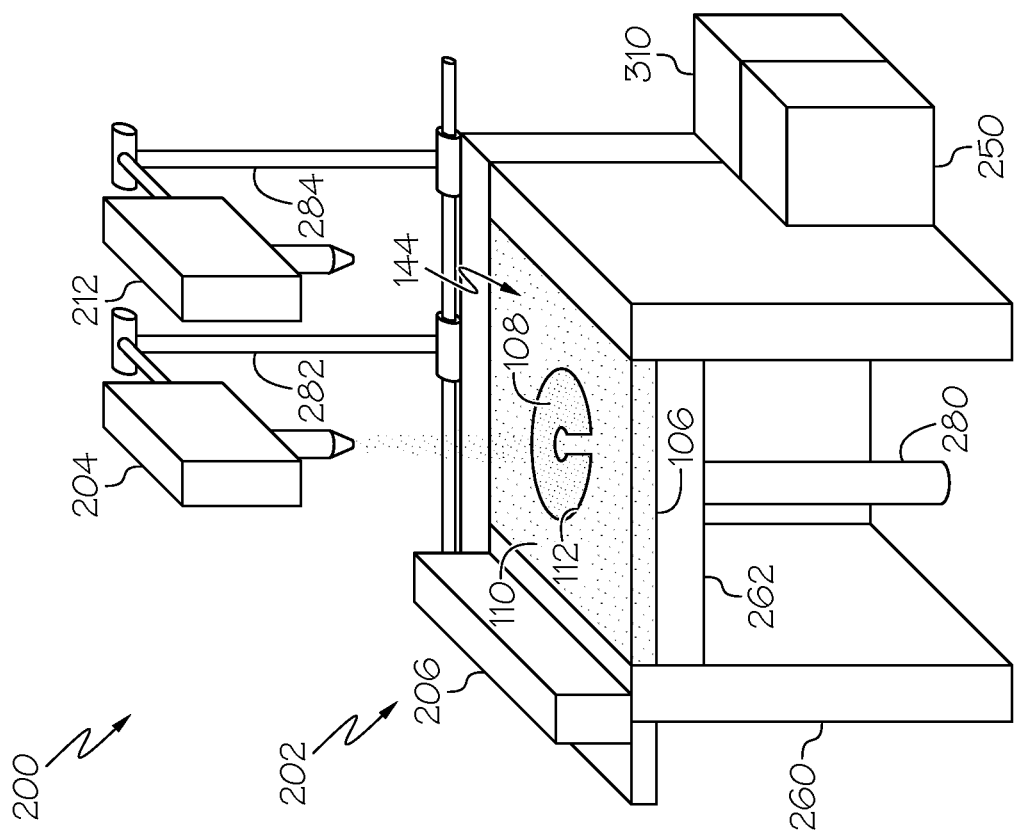
FIG. 3 is a schematic illustration of an example of the additive manufacturing system, in which an object layer is formed from the build powder.
Figure 4:
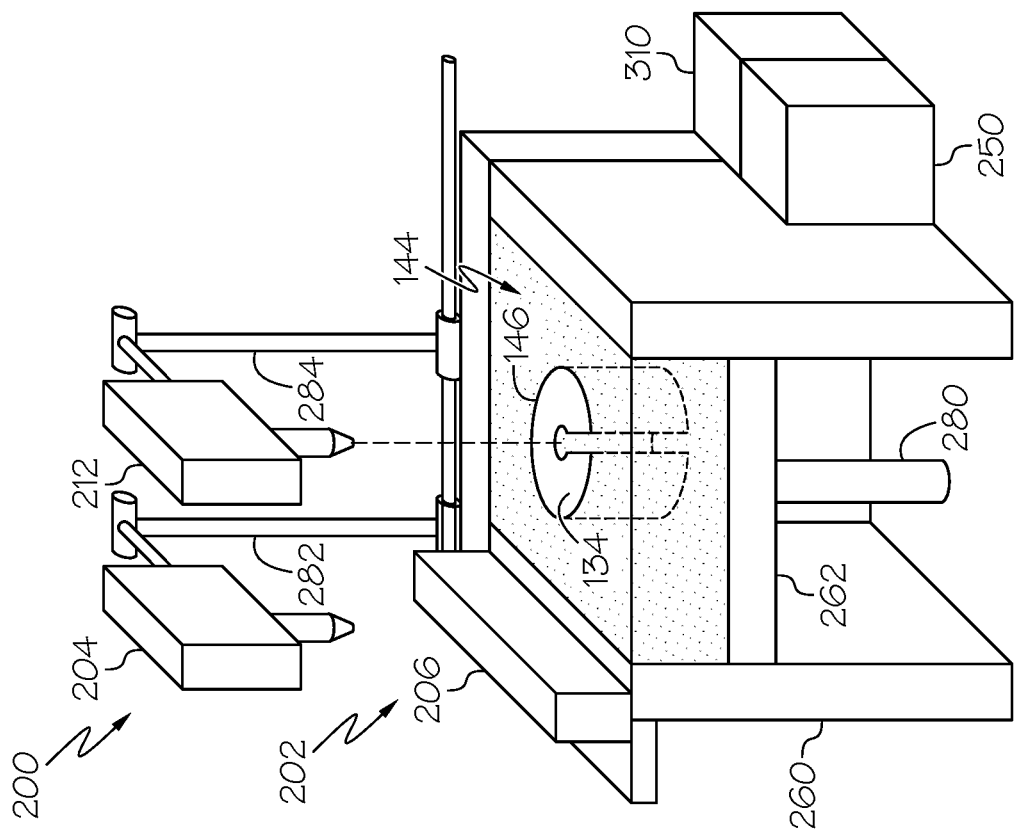
FIG. 4 is a schematic illustration of an example of the additive manufacturing system, in which a second powder layer is formed by the build powder and the support powder on the underlying powder layer and object layer.
Figure 5:
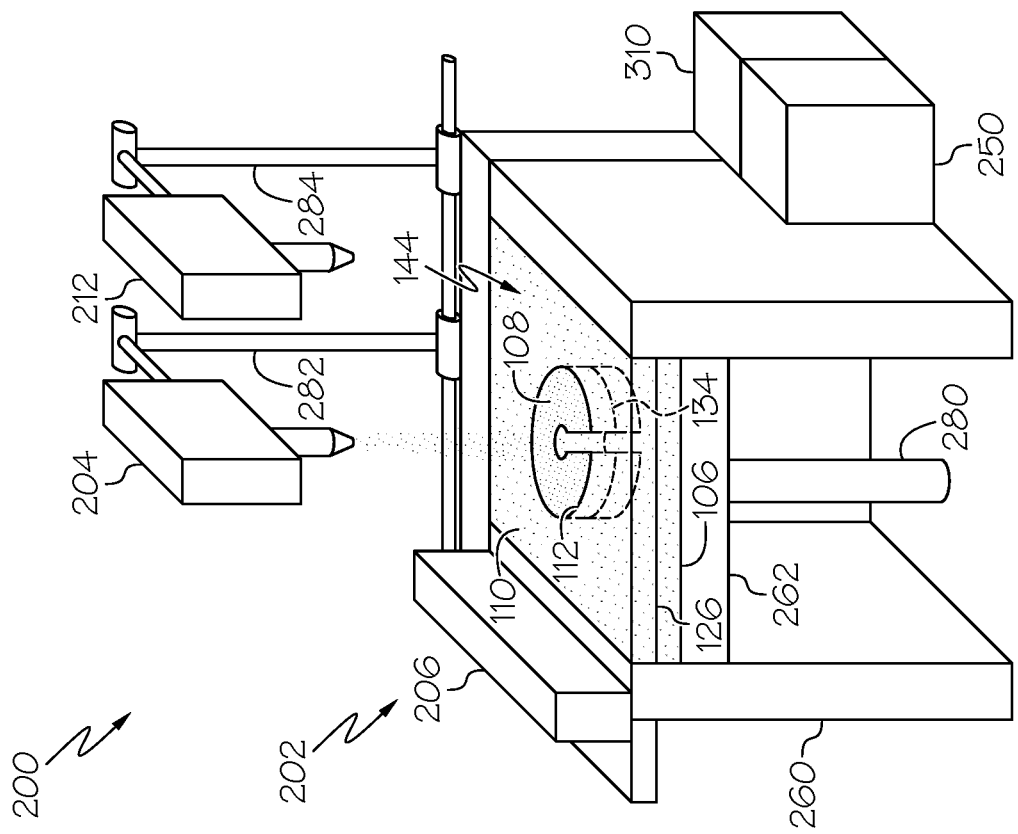
FIG. 5 is a schematic illustration of an example of the additive manufacturing system, in which an object is fully formed.

Referring to FIG. 2-5, according the additive manufacturing system 200 and the method 1000, in one or more examples, a powder layer 106 is formed in a powder bed 144 (FIG. 2). A portion of the powder layer 106 is joined to form an object layer 134 of the object 100 (FIG. 3). A second powder layer 126 is formed in the powder bed 144 and over the previously formed powder layer 106 and object layer 134 (FIG. 4). A portion of the second powder layer 126 is joined to the object layer 134, underlying the second powder layer 126, to add a new object layer to the object 100. This forming-and-joining procedure is repeated a number of times to form a plurality of object layers and, ultimately, to produce the object 100 (FIG. 5).

The present disclosure recognizes that powder used to make an object via powder bed additive manufacturing may be an expensive material and that it is desirable to reduce waste of such powder. The present disclosure also recognizes that a portion of the powder outside of a build contour is not joined to form a cross-sectional layer of the object and serves the purpose of supporting a portion of the powder used to form the cross-sectional layer of the object. The present disclosure further recognizes that it may be difficult or cumbersome to recycle an unused portion of the powder (the portion of the powder that is not joined when forming the object). Accordingly, one or more examples of the additive manufacturing system 200 and method 1000 provide techniques to selectively deposit different types of powder to form a powder layer, which results in a reduction of wasted powder used to make the object 100, a reduction in cost, a reduction in cycle time, and an increase in process efficiency.

Referring to FIG. 1, the method 1000 includes a step of (block 1002) selectively depositing build powder 102 inside of a build contour 112 of the object 100 to form a build-powder section 108 of the powder layer 106. The build powder 102 includes any powder material that is suitable to be joined layer-by-layer to make the object 100. Examples of the build powder 102 include, but are not limited to, metallic powder, metallic alloy powder, ceramic powder, polymeric powder, and the like.

The method 1000 also includes a step of (block 1004) selectively depositing support powder 104 outside of the build contour 112 to form a support-powder section 110 of the powder layer 106. The support powder 104 includes any powder material that is suitable to support the build powder 102 without being joined to the build powder 102. Examples of the support powder 104 include, but are not limited to, metallic powder, metallic alloy powder, ceramic powder, polymeric powder, and the like.

The build powder 102 includes a build-powder composition and the support powder 104 includes a support-powder composition. The build-powder composition and the support-powder composition are different. In other words, the build powder 102 and the support powder 104 are different types of powder layering material. Use of different types of powder material within the powder layer 106 of the powder bed 144 enables different powder material to be used for different purposes. According to the method 1000 and additive manufacturing system 200, the build powder 102 is used to form the object layer 134 and the support powder 104 is used to provide a foundation against which the build powder 102 is supported during formation of the object layer 134.

The build-powder composition of the build powder 102 is selected based on various factors, such as, but not limited to, desired material composition of the object 100, desired structural properties of the object 100, desired functional properties of the object 100, the type of joining process used to join the build powder 102 to make the object 100, and the like. The support-powder composition of the support powder 104 is selected based on various factors, such as, but not limited to, recyclability, cost, the type of joining process used to join the build powder 102 to make the object 100, and the like.

In one or more examples, the type of powder material used for the build powder 102 may also be based on other factors, such as, but not limited to, the isotropy of the powder material and resultant part (e.g., object 100) produced using the build powder 102; the as-printed surface roughness of the resultant part; the bondability of the power material to dissimilar materials; exposure capability to various chemicals, fuels, and cleaning agents; whether the powder material has to be stored and/or processed in an inert environment; among other factors.

In one or more examples, the type of powder material used for the support powder 104 may also be based on other factors, such as, but not limited to, the ability to break away or dissolve the material; the ability of supports formed on the support powder 104 to maintain shape, temperature capability, stiffness; among other factors.

Referring to FIGS. 2-5 and 9, the additive manufacturing system 200 includes a powder-deposition apparatus 202. The powder-deposition apparatus 202 is configured to selectively deposit the build powder 102 inside of the build contour 112 to form the build-powder section 108 of the powder layer 106. The powder-deposition apparatus 202 is also configured to selectively deposit the support powder 104 outside of the build contour 112 to form the support-powder section 110 of the powder layer 106.

In one or more examples, the additive manufacturing system 200 includes a build chamber 260 and a build platform 262 in the build chamber 260. For the purpose of illustration, a front wall (or front rail) of the build chamber 260 is omitted in FIGS. 2-5. The build platform 262 is provided to support the powder bed 144 and the object 100 (FIG. 5) made via the powder bed additive manufacturing process. The build chamber 260 provides a peripheral boundary to the build platform 262. In one or more examples, the build chamber 260 provides a peripheral boundary to the powder bed 144. In one or more examples, a seal (not shown) is in contact with the build platform 262 and the build chamber 260 to ensure that the build powder 102 and the support powder 104 remain in the build chamber 260 during formation of the object 100.

While the illustrative examples depict the build chamber 260 and the build platform 262 as having a square shape in transverse cross-section, in other examples, the build chamber 260 and the build platform 262 may have any geometric shape with a closed cross section, such as a circular shape, an elliptical shape, a rectangular shape, and the like.

As illustrated in FIGS. 2 and 6-9, in one or more examples, the powder-deposition apparatus 202 selectively deposits the build powder 102 at first locations on the build platform 262, inside of the build contour 112, to form the build-powder section 108 of the powder layer 106. The powder-deposition apparatus 202 selectively deposits the support powder 104 at second locations on the build platform 262, outside of the build contour 112, to form the support-powder section 110 of the powder layer 106.

In one or more examples, the method 1000 and the additive manufacturing system 200 convert a three-dimensional (3D) model into two-dimensional (2D) layers. The method 1000 and the additive manufacturing system 200 utilize a computer numerical control (CNC) accumulation process to selectively deposit the build powder 102 at the first locations and to selectively deposit the support powder 104 at the second locations according to a preprogrammed construction shape of each 2D layer and preprogrammed tool path of the powder-deposition apparatus 202 (e.g., G-code). The first locations, inside the build contour 112, correspond to the construction shape of the 2D layer of the 3D model.

Figure 6:
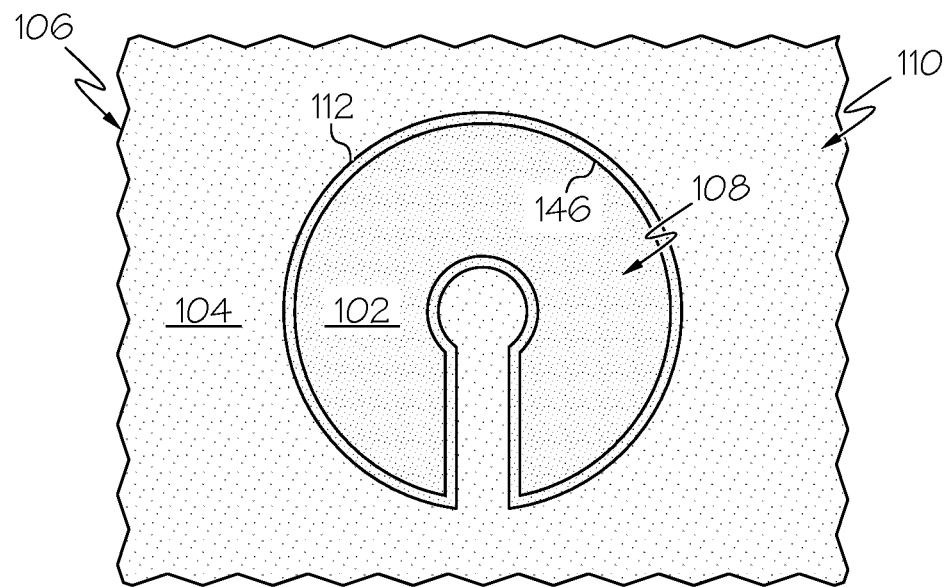
FIG. 6 is a schematic illustration of an example of a build contour.
Figure 10:
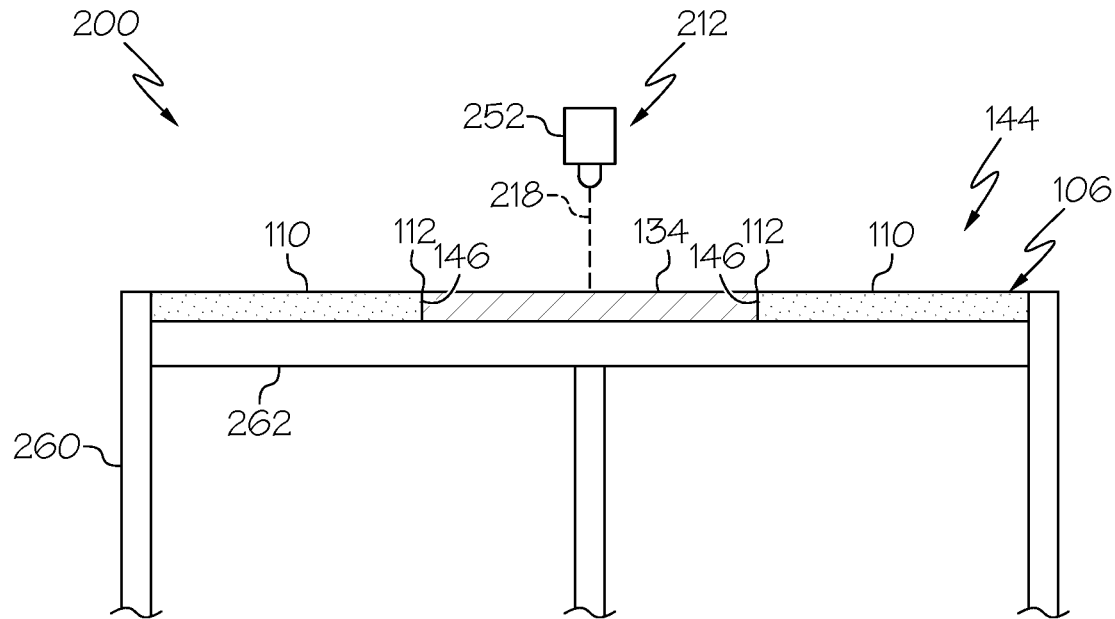
FIG. 10 is a schematic illustration of an example of the object layer formed by fusing the build powder.
Figure 11:
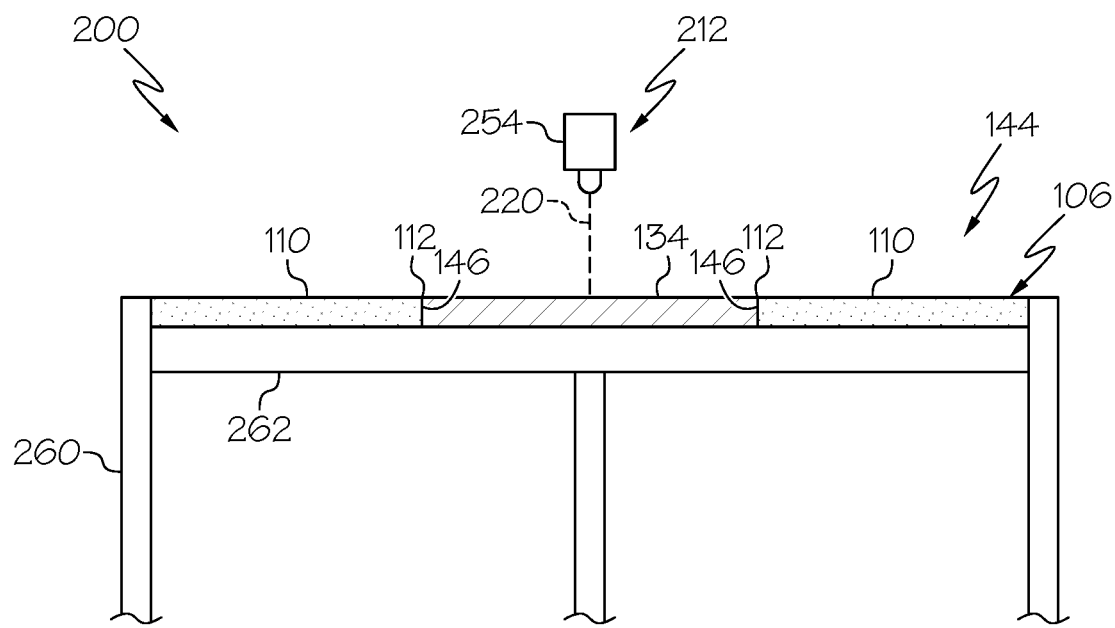
FIG. 11 is a schematic illustration of an example of the object layer formed by bonding the build powder.

Referring to FIG. 6, the build contour 112 marks the limit of an area formed by the build powder 102 or refers to a boundary between the build-powder section 108 and the support-powder section 110 of the powder layer 106. The build contour 112 may have any two-dimensional geometry. Generally, the two-dimensional geometry of the build contour 112 approximates or is equal to an object contour 146 of an associated cross-sectional layer of the object 100 (e.g., the object layer 134) (FIGS. 4, 10 and 11). The object contour 146 may have any two-dimensional geometry and forms a peripheral boundary of the associated cross-sectional layer of the object 100 (e.g., the object layer 134). In other words, the build contour 112 corresponds to a near net shape of the associated cross-sectional layer of the object 100.

Figure 7:
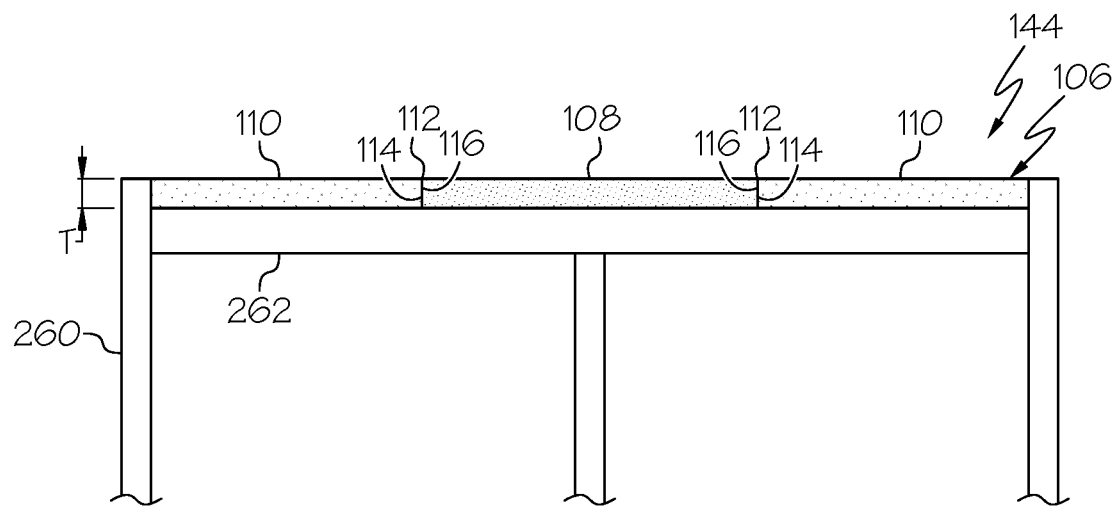
FIG. 7 is a schematic illustration of an example of the powder layer.
Figure 8:
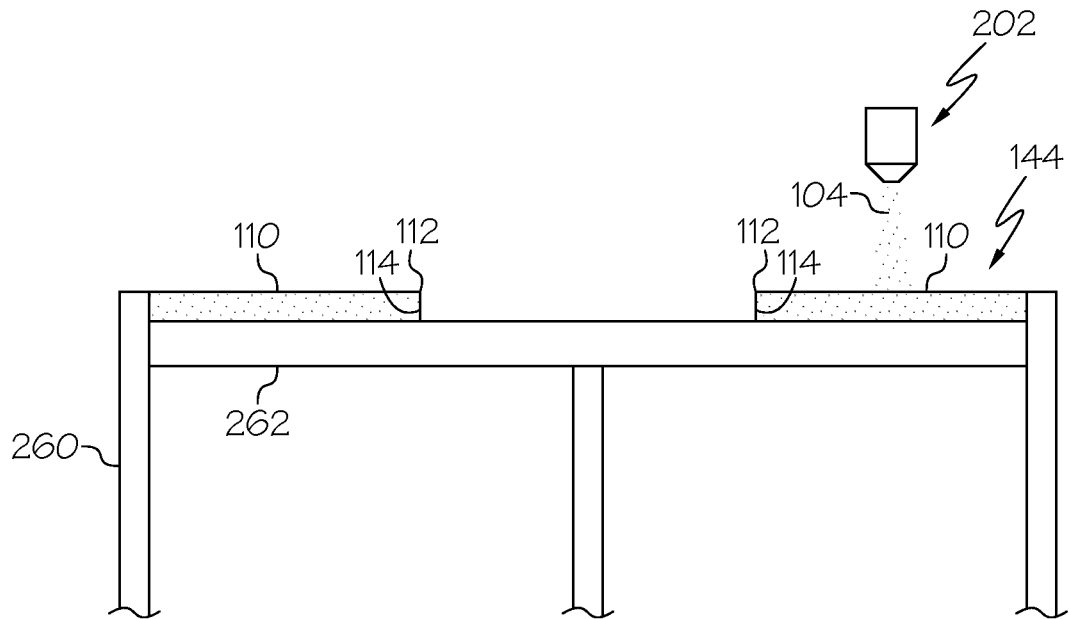
FIG. 8 is a schematic illustration of an example of a support-powder section of the powder layer formed prior to a build-powder section of the powder layer.

Referring to FIG. 1, in one or more examples, according to the method 1000, the step of (block 1004) selectively depositing the support powder 104 precedes the step of (block 1002) selectively depositing the build powder 102. Accordingly, in one or more examples, the powder-deposition apparatus 202 is configured to selectively deposit the support powder 104 before the build powder 102 is selectively deposited, as illustrated in FIGS. 7 and 8. In these examples, the support-powder boundary 114 of the support-powder section 110 of the powder layer 106 forms the build contour 112 and the build-powder boundary 116 of the build-powder section 108 of the powder layer 106 abuts the support-powder boundary 114 of the support-powder section 110 of the powder layer 106.

Referring to FIG. 1, in one or more examples, according to the method 1000, the step of (block 1002) selectively depositing the build powder 102 precedes the step of (block 1004) selectively depositing the support powder 104.

Figure 9:
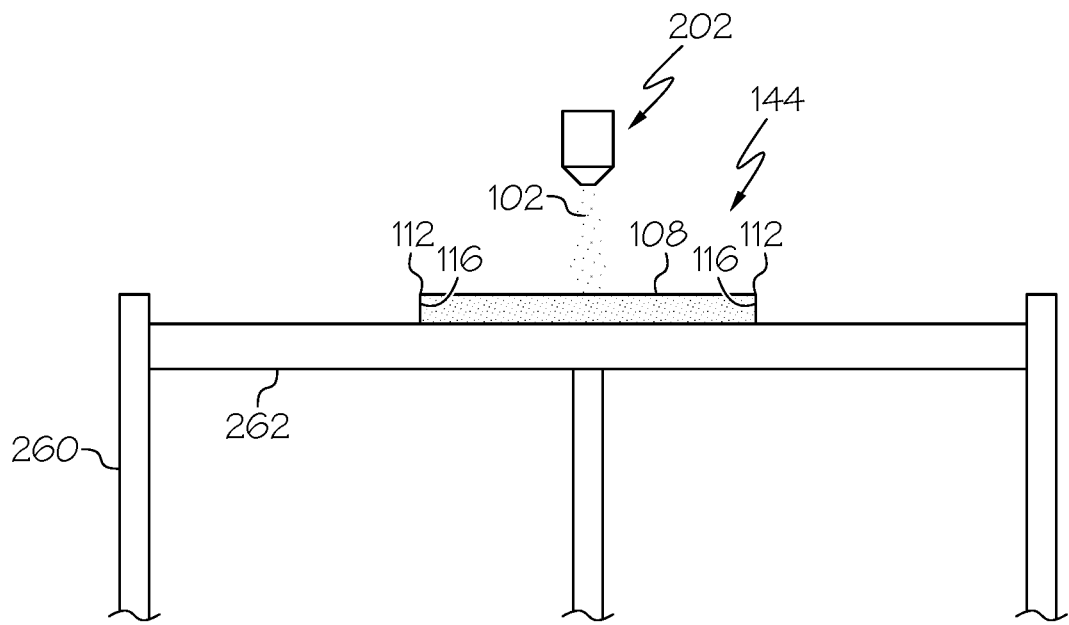
FIG. 9 is a schematic illustration of an example of the build-powder section of the powder layer formed prior to the support-powder section of the powder layer.

Accordingly, in one or more examples, the powder-deposition apparatus 202 is configured to selectively deposit the build powder 102 before the support powder 104 is selectively deposited, as illustrated in FIGS. 7 and 9. In these examples, the build-powder boundary 116 of the build-powder section 108 of the powder layer 106 forms the build contour 112 and the support-powder boundary 114 of the support-powder section 110 of the powder layer 106 abuts the build-powder boundary 116 of the build-powder section 108 of the powder layer 106.

In other examples, the step of (block 1002) selectively depositing the build powder 102 and the step of (block 1004) selectively depositing the support powder 104 occur concurrently. Accordingly, in one or more examples, the powder-deposition apparatus 202 is configured to selectively deposit the build powder 102 while the support powder 104 is selectively deposited.

By selectively depositing the build powder 102 at the first locations, inside the build contour 112, the build powder 102 is located where needed to form the object layer 134 (a cross-sectional layer of the object 100). Similarly, by selectively depositing the support powder 104 at the second locations, outside of the build contour 112, the support powder 104 is located where needed to support the build powder 102 when forming the object layer 134 layer of the object 100.

In one or more examples, the object 100 is composed of an aerospace material, such as a metal alloy or fiber-reinforced resin material. As such, the build-powder composition of the build powder 102 includes the same aerospace material in powder form, which may be relatively rare and/or expensive. The support powder 104 is composed of a more abundant and/or less expensive material in powder form. According to the additive manufacturing system 200 and the method 1000, the amount of build powder 102 used to form the powder layer 106 is limited to the amount required to from the object layer 134 (e.g., the cross-sectional layer of the object 100), which reduces wasted amounts of the build powder 102. The support powder 104 may be easily recycled because it will not be used to form an object in a subsequent use. In situations where the support powder 104 cannot be recycled, the cost associated with wasted amounts of the support powder 104 is significantly lower than the cost associated with wasted amounts of the build powder 102.

Referring to FIG. 1, in one or more examples, the method 1000 includes a step of (block 1006) joining the build powder 102 of the build-powder section 108 of the powder layer 106 to form the object layer 134. Accordingly, as illustrated in FIGS. 2-5, 10 and 11, in one or more examples, the additive manufacturing system 200 includes powder-joining apparatus 212. The powder-joining apparatus 212 is configured to join the build powder 102 of the build-powder section 108 of the powder layer 106 to form the object layer 134.

Referring to FIG. 1, in one or more examples, according to the method 1000, the step of (block 1006) joining the build powder 102 of the build-powder section 108 of the powder layer 106 includes a step of fusing the build powder 102 of the build-powder section 108 to form the object layer 134, for example, using an energy beam 218. Accordingly, as illustrated in FIG. 10, in one or more examples, the powder-joining apparatus 212 includes a directed energy device 252. The directed energy device 252 is configured to generate the energy beam 218 and direct the energy beam 218 towards the build powder 102. The energy beam 218 is suitable to fuse the build powder 102 of the build-powder section 108 of the powder layer 106 to form a solid cross-sectional layer of the object 100 (e.g., the object layer 134).

Examples of the method 1000 and the additive manufacturing system 200 that utilize the directed energy device 252 to fuse the build powder 102 include direct metal laser sintering (DMLS), direct metal laser fusion (DMLF), selective laser sintering (SLS), selective laser fusion (SLF), and electron beam melting (EBM). In these processes, the directed energy device 252 (e.g., a laser beam generator or electron beam generator) is used to apply the energy beam 218 (e.g., laser beam or electron beam) that melts or sinters the build powder 102 into a solid layer of material. The type fusing process, the type of directed energy device 252 used, and/or the type of energy beam 218 used to fuse the build powder 102 may depend of various factors, such as, but not limited to, the build powder composition of the build powder 102, the object 100 being made, and the like.

In one or more examples, different powder materials or different powder compositions of the build powder 102 may have processing parameters. In one or more examples, a controller 250 (FIGS. 2-5) is configured to execute, or otherwise perform, an iterative process built into the program instructions (e.g., code) that controls the energy beam 218, the power of the directed energy device 252, and other build parameters and is configured to vary the processing parameters based on the properties, quantities, and primarily melt points of the powder constituents being used for the build powder 102. As will be described in more detail herein, in one or more examples, a build-powder composition of the build powder 102 may vary within a given one of the plurality of powder layers, such as to produce a powder gradient within the powder layer. For example, the build powder 102, forming the build-powder section 108 of the powder layer 106, may include various percentages of a first constituent and a second constituent. When there is more (e.g., a greater percentage) of the first constituent in the build powder 102, the power and, thus, the temperature required to fuse the build powder 102 may be lower than when there is more (e.g., a greater percentage) of the second constituent. Accordingly, in one or more examples, it may take more power and higher temperatures to join (e.g., melt and bind) one compositional ratio of constituents than a different compositional ratio of constituents to build different sections of a cross-sectional layer of the object 100 (e.g., object layer 134). In one or more example, as the composition of the build powder 102 changes, the processing parameters are iterated upon by the controller 250 and a lookup table of values at what the parameters need to be at particular known composition levels.

Referring to FIG. 1, in one or more examples, according to the method 1000, the step of (block 1006) joining the build powder 102 of the build-powder section 108 of the powder layer 106 includes a step of bonding the build powder 102 of the build-powder section 108, for example, using a binder 220. Accordingly, as illustrated in FIG. 11, in one or more examples, the powder-joining apparatus 212 includes a binder-delivery device 254. The binder-delivery device 254 is configured to deposit the binder 220 on the build powder 102. The binder 220 is suitable to bond the build powder 102 of the build-powder section 108 of the powder layer 106 to form a solid cross-sectional layer of the object 100 (e.g., the object layer 134).

An example of the method 1000 and the additive manufacturing system 200 that utilize the binder-delivery device 254 to bond the build powder 102 include binder jetting. In this process, the binder-delivery device 254 (e.g., an inkjet print head) is used to apply the binder 220 (e.g., a binding agent) that bonds the build powder 102 into a solid layer of material. After the object 100 is fully formed, the object is encapsulated in the support powder 104 and is left to cure and gain strength. In one or more examples, a post-processing step may be required. For example, the object 100 may need to be heat treated to improve mechanical properties and/or reduce porosity.

Referring to FIGS. 2-5, in one or more examples, the build platform 262 is movable relative to the powder-deposition apparatus 202 and the powder-joining apparatus 212. In one or more examples, the build platform 262 moves vertically (e.g., is lowered) within the build chamber 260 relative to the powder-deposition apparatus 202 and the powder-joining apparatus 212 as successive layers of the object 100 are formed. In one or more examples, the build platform 262 moves horizontally relative to the powder-deposition apparatus 202 as the powder layer 106 is formed and/or relative to the powder-joining apparatus 212 as the object layer 134 is formed. In one or more examples, the build platform 262 rotates about a vertical axis relative to the powder-deposition apparatus 202 as the powder layer 106 is formed and/or relative to the powder-joining apparatus 212 as the object layer 134 is formed.

In one or more examples, the additive manufacturing system 200 includes a build-platform actuator 280 coupled to the build platform 262 and configured to drive movement of the build platform 262. In one or more examples, the build-platform actuator 280 includes, or takes the form of, a linear actuator. In one or more examples, the build-platform actuator 280 includes a turntable coupled to the build platform 262.

In one or more examples, the powder-deposition apparatus 202 is movable relative to the build platform 262. In one or more examples, the powder-deposition apparatus 202 moves vertically (e.g., is raised) relative to the build platform 262 as successive layers of the object 100 are formed. In one or more examples, the powder-deposition apparatus 202 moves horizontally relative to the build platform 262 as the powder layer 106 is formed. In one or more examples, the powder-deposition apparatus 202 has multiple degrees of freedom to accommodate multi-axis movement for depositing the build powder 102 and the support powder 104 at any location on the build platform 262.

In one or more examples, the additive manufacturing system 200 includes a powder-deposition actuator 282 coupled to the powder-deposition apparatus 202 and configured to drive movement of the powder-deposition apparatus 202. In one or more examples, the powder-deposition actuator 282 includes, or takes the form of, a linear actuator, a robotic actuator arm (e.g., a six-axis robotic actuator arm), and the like.

In one or more examples, the powder-joining apparatus 212 is movable relative to the build platform 262. In one or more examples, the powder-joining apparatus 212 moves vertically (e.g., is raised) relative to the build platform 262 as successive layers of the object 100 are formed. In one or more examples, the powder-joining apparatus 212 moves horizontally relative to the build platform 262 as the object layer 134 is formed. In one or more examples, the powder-joining apparatus 202 has multiple degrees of freedom to accommodate multi-axis movement for joining the build powder 102 at any location on the build platform 262.

In one or more examples, the additive manufacturing system 200 includes a powder-joining actuator 284 coupled to the powder-joining apparatus 212 and configured to drive movement of the powder-joining apparatus 212. In one or more examples, the powder-joining actuator 284 includes, or takes the form of, a linear actuator, a robotic actuator arm (e.g., a six-axis robotic actuator arm), and the like.

Referring still to FIGS. 2-5, in one or more examples, the additive manufacturing system 200 includes the controller 250. The controller 250 is in communication with operational components of the additive manufacturing system 200 via one or more communication lines, such as via wired communication and/or wireless communication. In one or more examples, the controller 250 is configured to generate command signals to control operation of the powder-deposition apparatus 202 and the powder-joining apparatus 212. For example, the controller 250 selectively controls operation of the powder-deposition apparatus 202 and the powder-joining apparatus 212 according to a predetermined plan (e.g., G-code), stored in the controller 250, to successively deposit-and-join the build powder 102.

In one or more examples, the controller 250 is configured to selectively control movement of the powder-deposition apparatus 202 according to a build-powder deposition pattern, stored in the controller 250, to selectively deposit the build powder 102 at the first locations, inside the build contour 112, and to selectively deposit the support powder 104 at the second locations, outside the build contour 112. In one or more examples, the controller 250 is also configured to selectively adjust the compositional ratio of a number of build-powder constituents forming the build powder 102 dispensed at different locations along the build-powder deposition pattern.

In one or more examples, the additive manufacturing system 200 includes a power source 310. The power source 310 is configured to provide power to the components of the additive manufacturing system 200, as required. In one or more examples, the power source 310 may be a single power source or may include a plurality of power sources working together to provide the necessary power output. Alternatively, the plurality of power sources may operate independently and may individually supply power to particular components of the additive manufacturing system 200. The power source 310 may be either an AC or a DC power source or may utilize a combination of AC and DC.

In one or more examples, the controller 250 is configured to generate command signals to control operation of the powder-deposition apparatus 202 and the powder-joining apparatus 212. As illustrated in FIGS. 2 and 7-9, under direction from the controller 250, the powder-deposition apparatus 202 traverses over the build platform 262 dispensing the build powder 102 and the support powder 104 to form the powder layer 106 according to a three-dimensional computer model of the object 100 stored in memory in the controller 250. As illustrated in FIGS. 3, 10 and 11, after the powder layer 106 is deposited on the build platform 262, the powder-joining apparatus 212 is activated and traverses over the build platform 262, under direction from the controller 250, to join selected areas of the build powder 102 to form the object layer 134 on the build platform 262. After formation of the object layer 134, the support powder 104 remains packed around the object layer 134.

Figure 12:
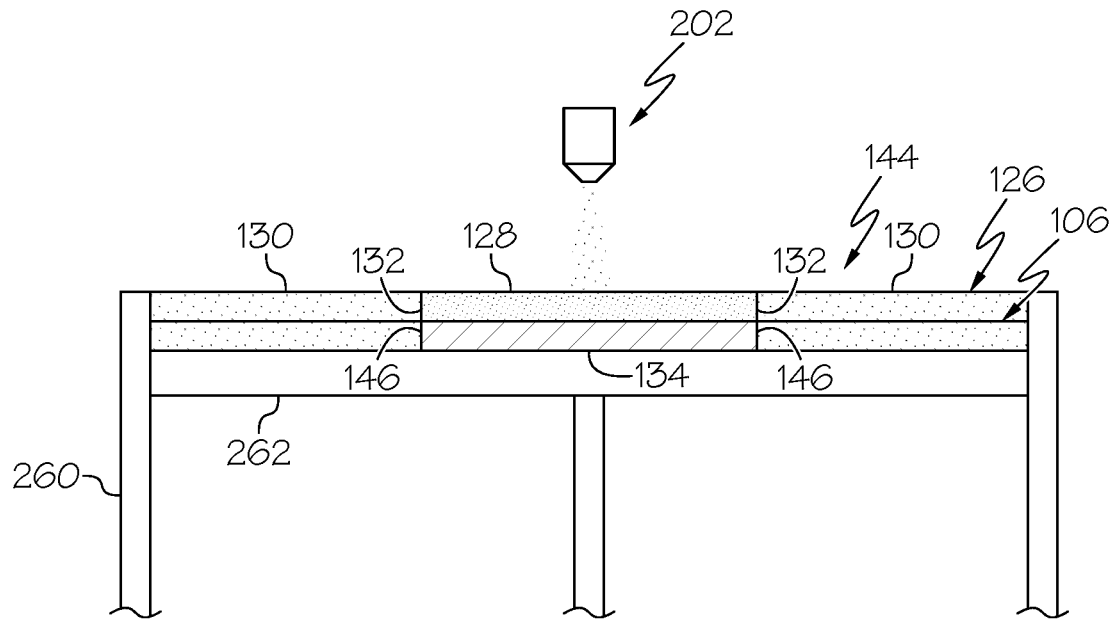
FIG. 12 is a schematic illustration of an example of the second powder layer formed on the underlying powder layer and object layer.
Figure 13:
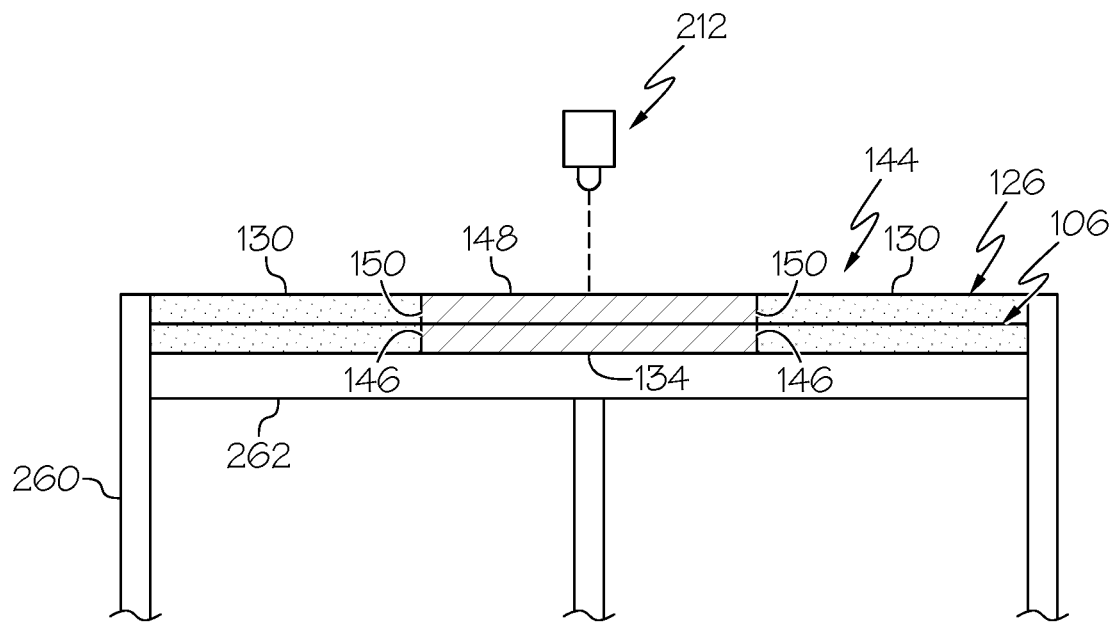
FIG. 13 is a schematic illustration of an example of a second object layer formed on the underlying object layer.

In one or more examples, under direction from the controller 250, the build platform 262 is indexed down by one layer of thickness. As illustrated in FIGS. 4 and 12, under direction from the controller 250, the powder-deposition apparatus 202 traverses over the build platform 262 dispensing the build powder 102 and the support powder 104 to form the second powder layer 126 according to the 3D computer model of the object 100 stored in the memory in the controller 250. As illustrated in FIG. 13, after the second powder layer 126 is deposited on the build platform 262, the powder-joining apparatus 212 is activated and traverses over the build platform 262, under direction from the controller 250, to join selected areas of the build powder 102 to form a second object layer 148 on the build platform 262 and to attach the second object layer 148 to the previously formed underlying object layer 134. After formation of the second object layer 148, the support powder 104 remains packed around the object layer 134 and the second object layer 148. The process is repeated, under direction from the controller 250, until the object 100 is completed, as illustrated in FIG. 5.

Referring to FIG. 1, in one or more examples, according to the method 1000, the step of (block 1002) selectively depositing the build powder 102 includes a step of selectively discharging the build powder 102 using a powder sprayer 204. Accordingly, as illustrated in FIGS. 2-5, in one or more examples, the powder-deposition apparatus 202 includes the powder sprayer 204. The powder sprayer 204 is configured to selectively deposit the build powder 102 to form the build-powder section 108 of the powder layer 106.

In one or more examples, the powder-deposition actuator 282 is coupled to the powder sprayer 204 and is configured to drive movement of the powder sprayer 204 relative to the build platform 262. In one or more examples, position and movement of the powder sprayer 204 relative to the build platform 262 is controlled via the powder-deposition actuator 282 under direction from the controller 250. In one or more examples, the powder-deposition actuator 282 moves the powder sprayer 204 to each one of the first locations on the build platform 262 for deposition of the build powder 102.

Figure 14:
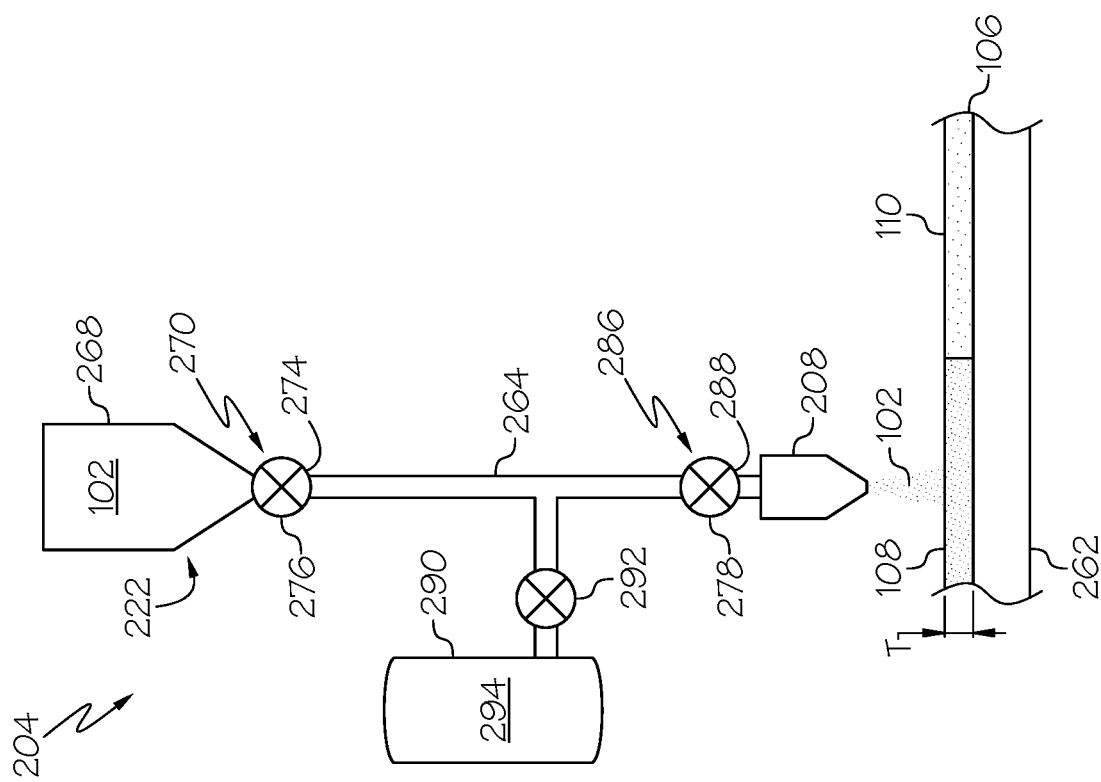
FIG. 14 is a schematic illustration of an example of a powder sprayer of the additive manufacturing system.

Referring to FIG. 14, in one or more examples, the powder sprayer 204 includes a build-powder feeder 222 and a nozzle 208. The nozzle 208 is in volumetric communication with the build-powder feeder 222 such that the build powder 102 is transferred from the build-powder feeder 222 to the nozzle 208. In one or more examples, the nozzle 208 is coupled to the build-powder feeder 222 via a feed line 264, such as a conduit, a tube, and the like.

In one or more examples, the build-powder feeder 222 is gravity fed such that the build powder 102 is dispensed by force of gravity. In one or more examples, the build-powder feeder 222 is drive fed such that the build powder 102 is dispensed by force of a propellant or by force of an actuator.

The build-powder feeder 222 is configured to hold the build powder 102 and to selectively dispense the build powder 102 to the nozzle 208. In one or more examples, the build-powder feeder 222 includes a build-powder hopper 268 and a build-powder regulator 270. The build-powder hopper 268 includes any suitable structure that is configured to store and dispense the build powder 102. The build-powder regulator 270 is configured to selectively dispense the build powder 102 from the build-powder hopper 268 to the nozzle 208, for example, via the feed line 264.

The build-powder regulator 270 includes any type of regulator suitable for selectively controlling a flow of the build powder 102 dispensed from the build-powder hopper 268. In one or more examples, the build-powder regulator 270 is configured to selectively control the amounts of the build powder 102 dispensed from the build-powder hopper 268. As such, the build-powder regulator 270 is capable of suppling the nozzle 208 with the build powder 102 based on system requirements.

In one or more examples, the build-powder regulator 270 includes a build-powder valve 274. The build-powder valve 274 is configured to regulate the flow of the build powder 102 from the build-powder hopper 268. The build-powder valve 274 is configured to be selectively open or selectively closed. In one or more examples, the build-powder valve 274 is a butterfly valve.

In one or more examples, the build-powder regulator 270 includes a build-powder mass sensor 276. The build-powder mass sensor 276 is configured to measure the mass of the build powder 102 passing through the build-powder regulator 270. In one or more examples, the build-powder mass sensor 276 provides in-line measurements such that the amount of the build powder 102 passing through the build-powder valve 274 can be accurately measured.

In one or more examples, the amount of the build powder 102 passing through the build-powder regulator 270 can be adjusted as required. In one or more examples, control of the build-powder regulator 270 is performed manually. In one or more examples, control of the build-powder regulator 270 is performed automatically, such as via control signals received from the controller 250 (FIGS. 2-5).

In one or more examples, the build-powder regulator 270 is actively controlled under direction from the controller 250 to selectively dispense a predetermined amount of the build powder 102 according to a predetermined plan stored in the controller 250. In one or more examples, the build-powder valve 274 is an electronic valve that is in communication with and is controlled by the controller 250. In one or more examples, the build-powder mass sensor 276 is in communication with the controller 250.

The amount of the build powder 102 dispensed from the build-powder feeder 222 is determined based on a number of known parameters and values. In one or more examples, the amount of the build powder 102 to be dispensed from the build-powder feeder 222 is based on a volume of the build powder 102 needed to form the build-powder section 108 of the powder layer 106 and a density of the build powder 102.

In one or more examples, the amount of the build powder 102 to be dispensed from the build-powder feeder 222 is based on a selected area to be covered by the build powder 102 (e.g., at a selected one of the first locations), a layer thickness (T) of the powder layer 106, an average particle size of the build powder 102, and an average particle density of the build powder 102. From these parameters, the mass of the build powder 102 needed to form the build-powder section 108 or a selected portion of the build-powder section 108 at a given one of the first locations can be determined. Once the predetermined mass of the build powder 102 is dispensed from the build-powder hopper 268, as measured by the build-powder mass sensor 276, the build-powder valve 274 is selectively closed under direction from the controller 250.

In one or more examples, the powder sprayer 204 includes a discharge regulator 286. The discharge regulator 286 is configured to selectively deliver the build powder 102 to, or through, the nozzle 208. In one or more examples, the discharge regulator 286 is configured to selectively control the rates at which the build powder 102 is delivered through the nozzle 208. As such, the discharge regulator 286 is capable of delivering the build powder 102 through the nozzle 208 based on system requirements.

In one or more examples, the discharge regulator 286 includes a discharge valve 288. The discharge valve 288 is configured to regulate the flow of the build powder 102 to, or through, the nozzle 208. The discharge valve 288 is configured to be selectively open, selectively closed, or selectively partially open. In one or more examples, the discharge valve 288 is a butterfly valve. In one or more examples, the discharge valve 288 is incorporated in the nozzle 208.

In one or more examples, the discharge regulator 286 includes a mass flow sensor 278. The mass flow sensor 278 is configured to measure the mass flow rate of the build powder 102 passing through the discharge regulator 286. In one or more examples, the mass flow sensor 278 provides in-line measurements such that the flow rate of the build powder 102 passing through the discharge valve 288 can be accurately measured.

In one or more examples, the flow rate of the build powder 102 can be adjusted as required. In one or more examples, control of the discharge regulator 286 is performed manually. In one or more examples, control of the discharge regulator 286 is performed automatically, such as via control signals received from a controller 250 (FIGS. 2-5).

In one or more examples, the discharge regulator 286 is actively controlled by the controller 250 to selectively dispense the build powder 102 at a predetermined flow rate according to a predetermined plan stored in the controller 250. In one or more examples, the discharge valve 288 is an electronic valve that is in communication with and is controlled by the controller 250. In one or more examples, the mass flow sensor 278 is in communication with the controller 250.

The flow rate of the build powder 102 delivered through the nozzle 208 and, thus, discharged from the nozzle 208 is determined based on a number of known parameters and values. In one or more examples, the flow rate of the build powder 102 to be discharged from the nozzle 208 is based on the volume of the build powder 102 needed to form the build-powder section 108 of the powder layer 106, the density of the build powder 102, the size of the nozzle 208, and a time duration.

In one or more examples, the flow rate of the build powder 102 to be discharged from the nozzle 208 is based on the selected area to be covered by the build powder 102 (e.g., at a selected one of the first locations), the layer thickness (T) of the powder layer 106, the average particle size of the build powder 102, the average particle density of the build powder 102, a volume of an exit orifice of the nozzle 208, and a time required to form the build-powder section 108. From these parameters, the mass flow rate of the build powder 102 needed to form the build-powder section 108 or a selected portion of the build-powder section 108 at a given one of the first locations can be determined. During discharge of the build powder 102 from the nozzle 208, the controller 250 monitors the mass flow rate of the build powder 102, as measured by the mass flow sensor 278. When a measured mass flow rate of the build powder 102 deviates from a predetermined mass flow rate of the build powder 102, the discharge valve 288 is selectively partially opened or selectively partially closed under direction from the controller 250, for example, to adjust the volume of the exit orifice of the nozzle 208, such that the measured mass flow rate of the build powder 102 and the predetermined mass flow rate of the build powder 102 are equal or are within an allowable tolerance.

In one or more examples, the nozzle 208 is configured to selectively discharge the build powder 102 and direct the build powder 102 towards the build platform 262. In one or more examples, position and movement of the nozzle 208 relative to the build platform 262 is controlled via the powder-deposition actuator 282 (FIGS. 2-5) under direction from the controller 250. In one or more examples, the powder-deposition actuator 282 moves the nozzle 208 to each one of the first locations on the build platform 262 and to a selected (e.g., desired) distance between the nozzle 208 and the build platform 262 for discharge of the build powder 102. In one or more examples, the nozzle 208 is maintained at a select one of the first locations and at the selected distance for a predetermined time, under direction from the controller 250, for discharge of the build powder 102 to form the build-powder section 108 of the powder layer 106 or a selected portion of the build-powder section 108 at the select one of the first locations.

Referring to FIG. 1, in one or more examples, according to the method 1000, the step of (block 1004) selectively depositing the support powder 104 includes a step of selectively discharging the support powder 104 using the powder sprayer 204. Accordingly, as illustrated in FIGS. 2-5, in one or more examples, the powder sprayer 204 is configured to selectively deposit the support powder 104 to form the support-powder section 110 of the powder layer 106. In one or more examples, the powder-deposition actuator 282 moves the powder sprayer 204 to each one of the second locations on the build platform 262 for discharge of the support powder 104.

Figure 15:
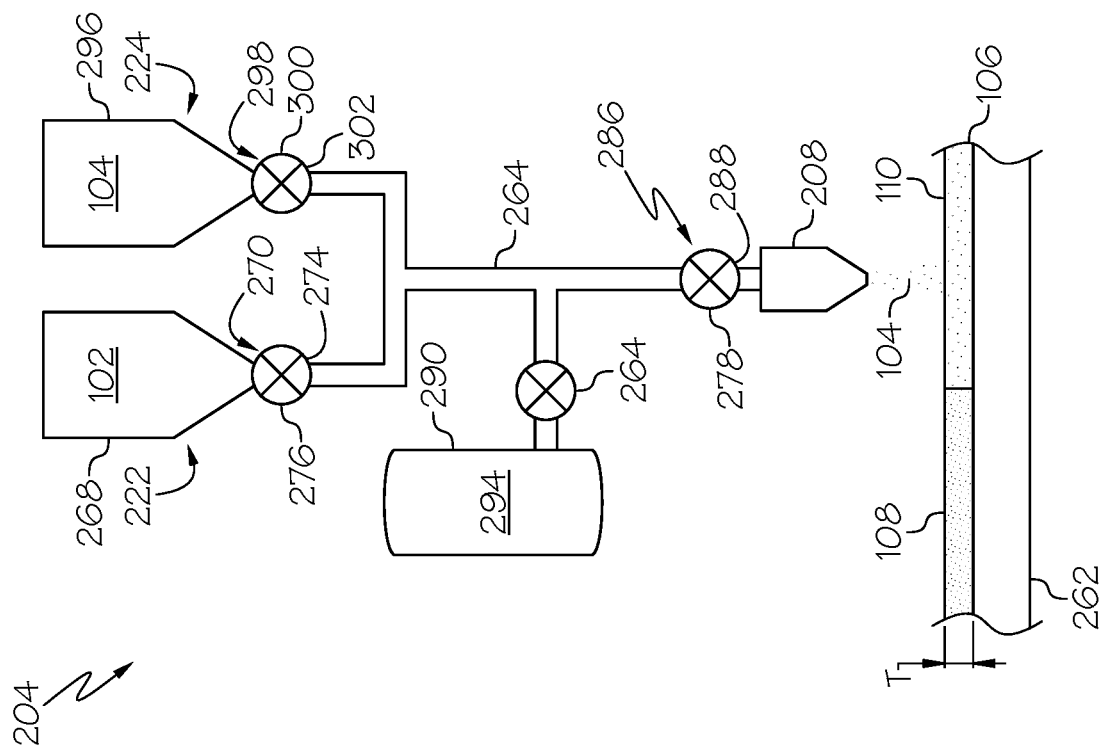
FIG. 15 is a schematic illustration of an example of the powder sprayer of the additive manufacturing system.

Referring to FIG. 15, in one or more examples, the powder sprayer 204 includes a support-powder feeder 224. In one or more examples, the nozzle 208 is in volumetric communication with the support-powder feeder 224 such that the support powder 104 is transferred from the support-powder feeder 224 to the nozzle 208. In one or more examples, the nozzle 208 is coupled to the support-powder feeder 224 via the feed line 264 and is configured to selectively discharge the support powder 104.

In one or more examples, the support-powder feeder 224 is gravity fed such that the support powder 104 is dispensed by force of gravity. In one or more examples, the support-powder feeder 224 is drive fed such that the support powder 104 is dispensed by force of a propellant or by force of an actuator.

The support-powder feeder 224 is configured to hold the support powder 104 and to selectively dispense the support powder 104 to the nozzle 208. In one or more examples, the support-powder feeder 224 includes a support-powder hopper 296 and a support-powder regulator 298. The support-powder hopper 296 includes any suitable structure that is configured to store and dispense the support powder 104. The support-powder regulator 298 is configured to selectively dispense the support powder 104 from the support-powder hopper 296 to the nozzle 208, for example, via the feed line 264.

The support-powder regulator 298 includes any type of regulator suitable for selectively controlling a flow of the support powder 104 dispensed from the support-powder hopper 296. In one or more examples, the support-powder regulator 298 is configured to selectively control the amounts of the support powder 104 dispensed from the support-powder hopper 296. As such, the support-powder regulator 298 is capable of suppling the nozzle 208 with the support powder 104 based on system requirements.

In one or more examples, the support-powder regulator 298 includes a support-powder valve 300. The support-powder valve 300 is configured to regulate the flow of the support powder 104 from the support-powder hopper 296. The support-powder valve 300 is configured to be selectively open or selectively closed. In one or more examples, the support-powder valve 300 is a butterfly valve.

In one or more examples, the support-powder regulator 298 includes a support-powder mass sensor 302. The support-powder mass sensor 302 is configured to measure the mass of the support powder 104 passing through the support-powder regulator 298. In one or more examples, the support-powder mass sensor 302 provides in-line measurements such that the amount of the support powder 104 passing through the support-powder valve 300 can be accurately measured.

In one or more examples, the amount of the support powder 104 passing through the support-powder regulator 298 can be adjusted as required. In one or more examples, control of the support-powder regulator 298 is performed manually. In one or more examples, control of the support-powder regulator 298 is performed automatically, such as via control signals received from the controller 250 (FIGS. 2-5).

In one or more examples, the support-powder regulator 298 is actively controlled under direction from the controller 250 to selectively dispense a predetermined amount of the support powder 104 according to a predetermined plan stored in the controller 250. In one or more examples, the support-powder valve 300 is an electronic valve that is in communication with and is controlled by the controller 250. In one or more examples, the support-powder mass sensor 302 is in communication with the controller 250.

The amount of the support powder 104 dispensed from the support-powder feeder 224 is determined based on a number of known parameters and values. In one or more examples, the amount of the support powder 104 to be dispensed from the support-powder feeder 224 is based on a volume of the support powder 104 needed to form the support-powder section 110 of the powder layer 106 and a density of the support powder 104.

In one or more examples, the amount of the support powder 104 to be dispensed from the support-powder feeder 224 is based on a selected area to be covered by the support powder 104 (e.g., at a selected one of the second locations), the layer thickness (T) of the powder layer 106, an average particle size of the support powder 104, and an average particle density of the support powder 104. From these parameters, the mass of the support powder 104 needed to form the support-powder section 110 or a selected portion of the support-powder section 110 at a given one of the second locations can be determined. Once the predetermined mass of the support powder 104 is dispensed from the support-powder hopper 296, as measured by the support-powder mass sensor 302, the support-powder valve 300 is selectively closed under direction from the controller 250.

In one or more examples, the discharge regulator 286 is configured to selectively deliver the support powder 104 to, or through, the nozzle 208. In one or more examples, the discharge regulator 286 is configured to selectively control the rates at which the support powder 104 is delivered through the nozzle 208. As such, the discharge regulator 286 is capable of delivering the support powder 104 through the nozzle 208 based on system requirements.

In one or more examples, the discharge valve 288 is configured to regulate the flow of the support powder 104 to, or through, the nozzle 208. In one or more examples, the mass flow sensor 278 is configured to measure the mass flow rate of the support powder 104 passing through the discharge regulator 286. In one or more examples, the mass flow sensor 278 provides in-line measurements such that the flow rate of the support powder 104 passing through the discharge valve 288 can be accurately measured. In one or more examples, the flow rate of the support powder 104 can be adjusted as required.

In one or more examples, the discharge regulator 286 is actively controlled by the controller 250 to selectively dispense the support powder 104 at a predetermined flow rate according to a predetermined plan stored in the controller 250. The flow rate of the support powder 104 delivered through the nozzle 208 and, thus, discharged from the nozzle 208 is determined based on a number of known parameters and values. In one or more examples, the flow rate of the support powder 104 to be discharged from the nozzle 208 is based on the volume of the support powder 104 needed to form the support-powder section 110 of the powder layer 106, the density of the support powder 104, the size of the nozzle 208, and a time duration.

In one or more examples, the flow rate of the support powder 104 to be discharged from the nozzle 208 is based on the selected area to be covered by the support powder 104 (e.g., at a selected one of the second locations), the layer thickness (T) of the powder layer 106, the average particle size of the support powder 104, the average particle density of the support powder 104, the volume of the exit orifice of the nozzle 208, and a time required to form the support-powder section 110. From these parameters, the mass flow rate of the support powder 104 needed to form the support-powder section 110 or a selected portion of the support-powder section 110 at a given one of the second locations can be determined. During discharge of the support powder 104 from the nozzle 208, the controller 250 monitors the mass flow rate of the support powder 104, as measured by the mass flow sensor 278. When a measured mass flow rate of the support powder 104 deviates from a predetermined mass flow rate of the support powder 104, the discharge valve 288 is selectively partially opened or selectively partially closed under direction from the controller 250, for example, to adjust the volume of the exit orifice of the nozzle 208, such that the measured mass flow rate of the support powder 104 and the predetermined mass flow rate of the support powder 104 are equal or are within a predetermined tolerance.

In one or more examples, the nozzle 208 is configured to selectively discharge the support powder 104 and direct the support powder 104 towards the build platform 262. In one or more examples, position and movement of the nozzle 208 relative to the build platform 262 is controlled via the powder-deposition actuator 282 (FIGS. 2-5) under direction from the controller 250. In one or more examples, the powder-deposition actuator 282 moves the nozzle 208 to each one of the second locations on the build platform 262 and to a selected (e.g., desired) distance between the nozzle 208 and the build platform 262 for discharge of the support powder 104. In one or more examples, the nozzle 208 is maintained at a select one of the second locations and at the selected distance for a predetermined time, under direction from the controller 250, for discharge of the support powder 104 to form the support-powder section 110 of the powder layer 106 or a selected portion of the support-powder section 110 at the select one of the second locations.

The nozzle 208 is any suitable powder delivery nozzle configured to discharge a solid powder material. In one or more examples, the nozzle 208 is a single orifice nozzle. The nozzle 208 is configured to provide accurate and precise placement of the build powder 102 at the first locations, inside the build contour 112. In one or more examples, the nozzle 208 is configured to provide accurate and precise placement of the support powder 104 at the second locations, outside the build contour 112.

The build powder 102 is discharged from the nozzle 208 at a suitable velocity to enable accurate and precise placement of the build powder 102 to form the build-powder section 108 of the powder layer 106. The support powder 104 is discharged from the nozzle 208 at a suitable velocity to enable accurate and precise placement of the support powder 104 to form the support-powder section 110 of the powder layer 106. In one or more examples, the nozzle 208 is gravity fed such that the build powder 102 or the support powder 104 is discharged from the nozzle 208 by force of gravity. In one or more examples, the nozzle 208 is drive fed such that the build powder 102 or the support powder 104 is discharged from the nozzle 208 by force of a propellant or by force of an actuator.

In one or more examples, the powder sprayer 204 includes a tank 290. The tank 290 includes any suitable structure that is configured to hold a gas propellent 294. The gas propellent 294 is a pressurized gas that is used as a propellant through the feed line 264 for discharging the build powder 102 or the support powder 104 from the nozzle 208. In one or more examples, the powder sprayer 204 includes a propellent regulator 292. The propellent regulator 292 is configured to supply the gas propellent 294 from the tank 290 to the nozzle 208 via the feed line 264.

The propellent regulator 292 includes any pressure or flow regulator that controls the output pressure or flow of a fluid to a desired value. As an example, the propellent regulator 292 includes a valve. In one or more examples, an output pressure or flow of the propellent regulator 292 can be adjusted based on command signals received from the controller 250.

In one or more examples, the gas propellant 294 is any gas propellant suitable for propelling a solid powder material (e.g., the build powder 102 and the support powder 104). As an example, the gas propellant is an inert gas propellant. By selecting the gas propellant as an inert gas propellant, a chemical reaction between the powder material and the gas propellant can be minimized or avoided. As examples, the gas propellant is at least one of argon, helium, and nitrogen.

In the illustrative examples, the powder sprayer 204 uses one nozzle (e.g., the nozzle 208) and one regulator (e.g., the discharge regulator 286) that is associated with and shared by both of the build-powder feeder 222 and the support-powder feeder 224 for selectively depositing the build powder 102 and the support powder 104. However, in other examples, the powder sprayer 204 may include more than one nozzle and/or more than one regulator, in which each nozzle and regulator is associated with, or is dedicated to, one of the build-powder feeder 222 or the support-powder feeder 224 for selectively depositing the build powder 102 and the support powder 104.

Accordingly, use of the powder sprayer 204 provides accurate and precise placement of the build powder 102 at the first locations to form the build-powder section 108 of the powder layer 106 and the support powder 104 at the second locations to form the support-powder section 110 of the powder layer 106 having uniform results. In one or more examples, such placement eliminates the need for a secondary step of spreading or distributing the build powder 102 or the support powder 104 across the build platform 262, such as by way of a powder-spreading device (e.g., a wiper or a roller), which improves processing efficiency.

Referring to FIG. 1, in one or more examples, according to the method 1000, the step of (block 1004) selectively depositing the support powder 104 includes a step of selectively discharging the support powder 104 using a recoater 206. Accordingly, as illustrated in FIGS. 2-5, in one or more examples, the powder-deposition apparatus 202 includes the recoater 206. The recoater 206 is configured to selectively deposit the support powder 104 to form the support-powder section 110 of the powder layer 106.

The recoater 206 is capable of selectively depositing the support powder 104 at the second locations, outside the build contour 112, at a faster deposition rate as compared to the powder sprayer 204. Accordingly, use of the recoater 206 to deposit the support powder 104 reduces the per layer processing time. Increasing the deposition speed for the support powder 104 is particularly advantageous for applications in which a large portion of each powder layer is formed by the support powder 104.

In one or more examples, the step of (block 1004) selectively depositing the support powder 104 includes the step of selectively discharging the support powder 104 using the recoater 206 to form a first portion of the support-powder section 110 of the powder layer 106 and the step of selectively discharging the support powder 104 using the powder sprayer 204 to form a second portion of the support-powder section 110 of the powder layer 106. For example, the recoater 206 may deposit the support powder 104 over a relatively large area farther from the build contour 112 and the powder sprayer 204 may deposit the support powder 104 over a relatively small area closer to build contour 112 where finer control of powder deposition is beneficial.

In one or more examples, the powder-deposition actuator 282 is coupled to the recoater 206 and is configured to drive movement of the recoater 206 relative to the build platform 262. Position and movement of the recoater 206 relative to the build platform 262 is controlled via the powder-deposition actuator 282 under direction from the controller 250. In one or more examples, the powder-deposition actuator 282 moves the recoater 206 linearly across the build platform 262 to discharge of the support powder 104 at each one of the second locations on the build platform 262.

Figure 16:
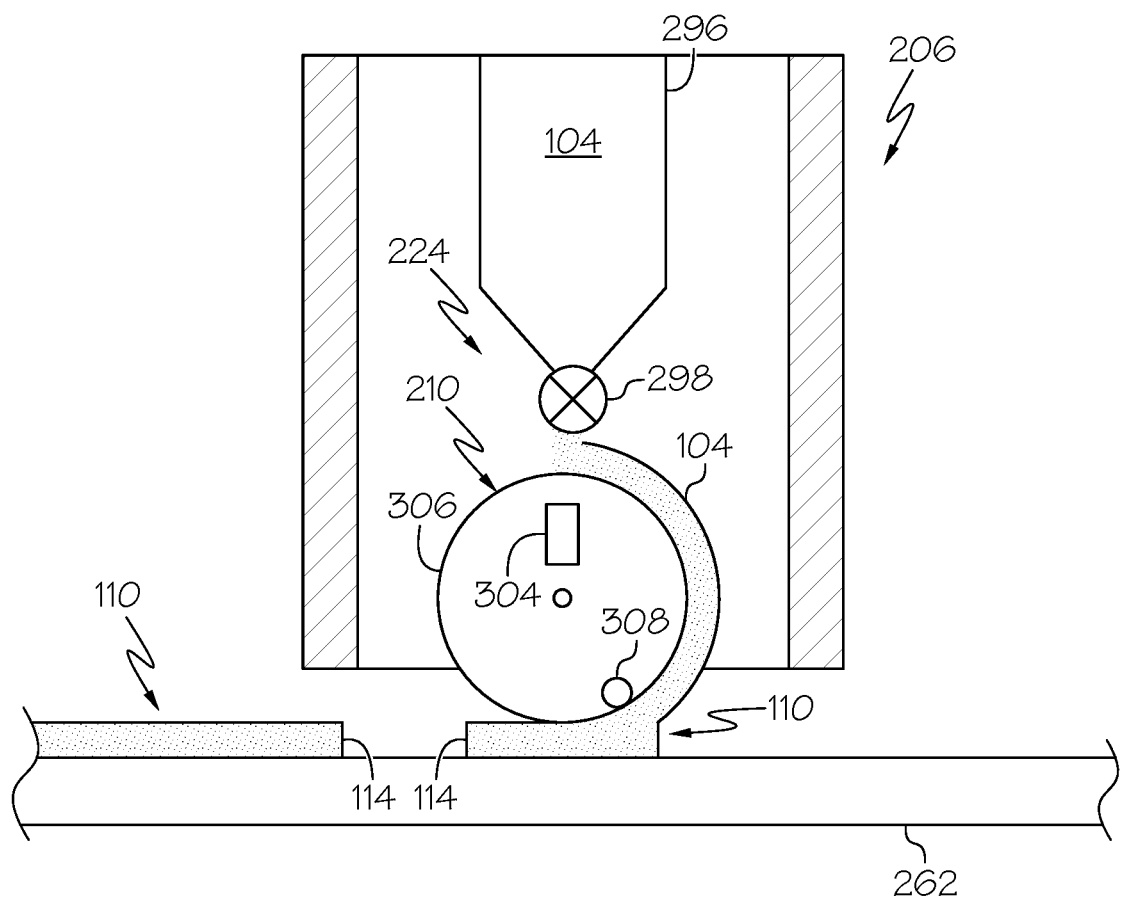
FIG. 16 is a schematic illustration of an example of a recoater of the additive manufacturing system.

Referring to FIG. 16, in one or more examples, the recoater 206 includes the support-powder feeder 224 and a roller 210. The support-powder feeder 224 is configured to selectively dispense the support powder 104 to the roller 210. In one or more examples, a flow of the support powder 104 from the support-powder feeder 224 to the roller 210 is controlled by the support-powder regulator 298, in a similar manner as described above.

The roller 210 is configured to collect the support powder 104 from the support-powder feeder 224 and to selectively discharge the support powder 104 at the second locations, outside of the build contour 112, on the build platform 262 to form the support-powder section 110 of the powder layer 106. In one or more examples, the roller 210 has a surface 306 with a cylindrical shape and is configured to rotate about a cylinder axis while discharging the support powder 104.

In one or more examples, the support powder 104 is selectively maintained on the surface 306 of the roller 210 using adhesion distributed over the surface 306. The support powder 104 is selectively detached from the surface 306 by releasing the adhesion. Detached particles of the support powder 104 are selectively deposited at the second locations, outside of the build contour 112, on the build platform 262 as the roller 210 traverses the build platform 262 to form the support-powder section 110 of the powder layer 106.

In one or more examples, the recoater 206 includes an adhesion mechanism 304. In one or more examples, the adhesion mechanism 304 is located in or is part of the roller 210. The adhesion mechanism 304 is configured to generate an adhesion force that has a component perpendicular to the surface 306 under direction from the controller 250. The support-powder feeder 224 deposits the support powder 104 on the surface 306 of the roller 210. The adhesion force acts in a radially inward direction to hold the support powder 104 on the surface 306.

In one or more examples, the adhesion mechanism 304 is also configured to selectively disengage or release the adhesion force, under direction from the controller 250, such that the support powder 104 is detached from the surface 306. Alternatively, or in addition to, in one or more examples, the recoater 206 includes an ejection mechanism 308. In one or more examples, the ejection mechanism 308 is located in or is a part of the roller 210. The ejection mechanism 308 is configured to generate an ejection force that has a component perpendicular to the surface 306 and that acts in a radially outward direction, under direction from the controller 250. The ejection force overcomes and locally breaks the adhesion force between the surface 306 and the support powder 104 to selectively detach the support powder 104 from the surface 306.

In one or more examples, the adhesion mechanism 304 is configured to selectively attach the support powder 104 to selected portions of the surface 306 of the roller 210 as the support powder 104 is deposited on the surface 306, under direction from the controller 250. The selected portions of the surface 306 correspond to ones of the second locations on the build platform 262 that are traversed by the roller 210. As such, an entirety of the support powder 104 located on the surface 306 is detached from the surface 306, by at least one of removing the adhesion force or producing the ejection force, as the roller 210 traverses the build platform 262.

Alternatively, in one or more examples, the adhesion mechanism 304 is configured to attach the support powder 104 to an entirety of the surface 306 of the roller as the support powder 104 is deposited on the surface 306. The adhesion mechanism 304 and/or the ejection mechanism 308 are configured to selectively detach the support powder 104 from selected portions of the surface 306 that correspond to ones of the second locations on the build platform 262 as the roller 210 traverses the build platform 262. As such, selected portions of the support powder 104 located on the surface 306 are detached from the surface 306, by at least one of removing the adhesion force or producing the ejection force, as the roller 210 traverses the build platform 262.

In one or more examples, the adhesion force that is selectively activated and, optionally, selectively deactivated by the adhesion mechanism 304 to attach the support powder 104 to the surface 306 of the roller 210 is at least one of magnetic force, electrostatic force, Van der Waals force, negative pressure force from vacuum, positive pressure force from a flow of gas, and the like. Similarly, these same forces can be used for the ejection force that is selectively activated and selectively deactivated by the ejection mechanism 308 to detach the support powder 104 from the surface 306 of the roller 210. As expressed above, these forces can be local, corresponding only to certain portions of the surface 306 of the roller 210, or can be distributed, corresponding to an entirely of the surface 306 of the roller 210.

Referring to FIG. 1, in one or more examples, the method 1000 includes a step of (block 1008) selectively controlling the build-powder composition of the build powder 102. Accordingly, in one or more examples, the powder sprayer 204 is configured to selectively control the build-powder composition of the build powder 102.

In one or more examples, according to the method 1000, the step of (block 1008) selectively controlling the build-powder composition of the build powder 102 and the step of (block 1002) selectively depositing the build powder 102 occur concurrently. For example, the build-powder feeder 222 is configured to selectively control the build-powder composition of the build powder 102, under direction from the controller 250, being dispensed to the nozzle 208 while the build powder 102 is being discharged from the nozzle 208. As such, the build-powder composition of the build powder 102 can be controlled in real-time as the powder sprayer 204 moves relative to the build platform 262 to deposit the build powder 102 at the first locations, inside the build contour 112, to form the build-powder section 108 of the powder layer 106. This real-time control of the build-powder composition of the build powder 102 increases process efficiency and reduces cycle time.

The present disclosure recognizes there are advantages to providing an object that has a compositional gradient in one or more axial directions. The present disclosure also recognizes it may be difficult to form the object having a compositional gradient using conventional manufacturing techniques. One or more examples of the additive manufacturing system 200 and the method 1000 provide techniques to selectively deposit a powder gradient in one or more of the powder layers, which results in the object 100 having a compositional gradient that can be tailored based on a desired physical property, chemical property, electrical property, thermal property, and/or magnetic property within the object 100.

Referring to FIG. 1, in one or more examples, the step of (block 1008) selectively controlling the build-powder composition of the build powder 102 includes a step of selectively varying the build-powder composition of the build powder 102 to achieve a powder gradient 152 (FIG. 17) within the build-powder section 108 of the powder layer 106. In one or more examples, the build powder 102 includes a mixture of a build-powder first constituent 122 and a build-powder second constituent 124 (FIG. 18). According to the method 1000, the step of (block 1008) selectively controlling the build-powder composition of the build powder 102 includes a step of selectively controlling a compositional ratio of the build-powder first constituent 122 and the build-powder second constituent 124 in the build-powder section 108 of the powder layer 106.

Figure 17:
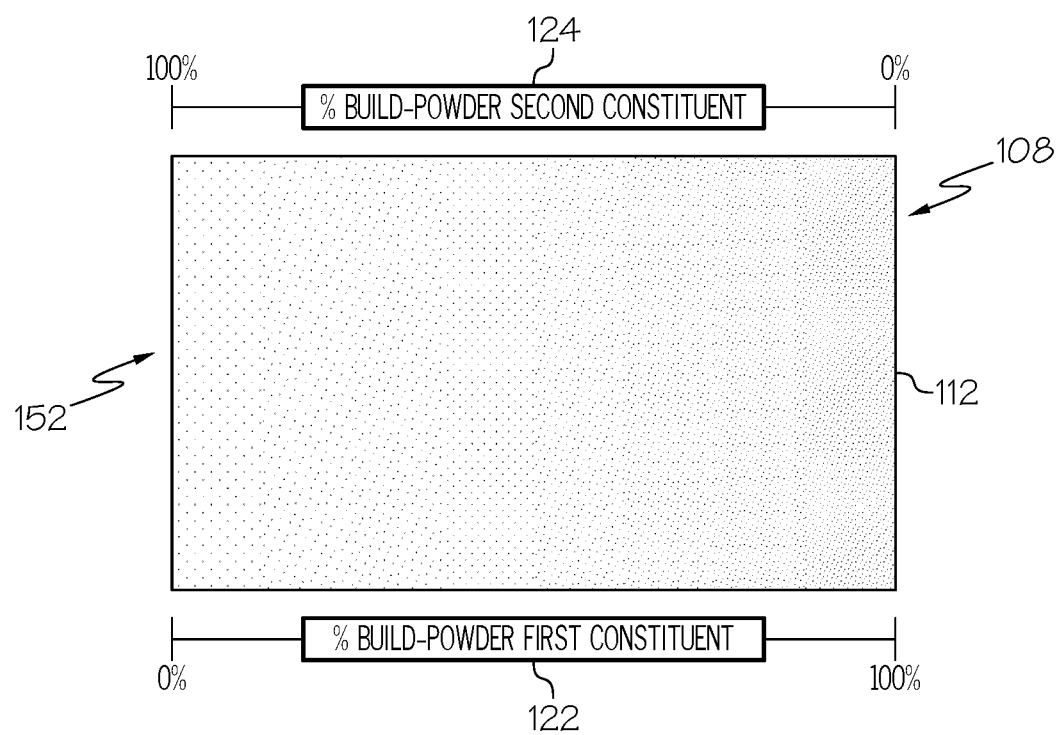
FIG. 17 is a schematic diagram of an example of a powder gradient formed in the build-powder section of the powder layer.
Figure 18:
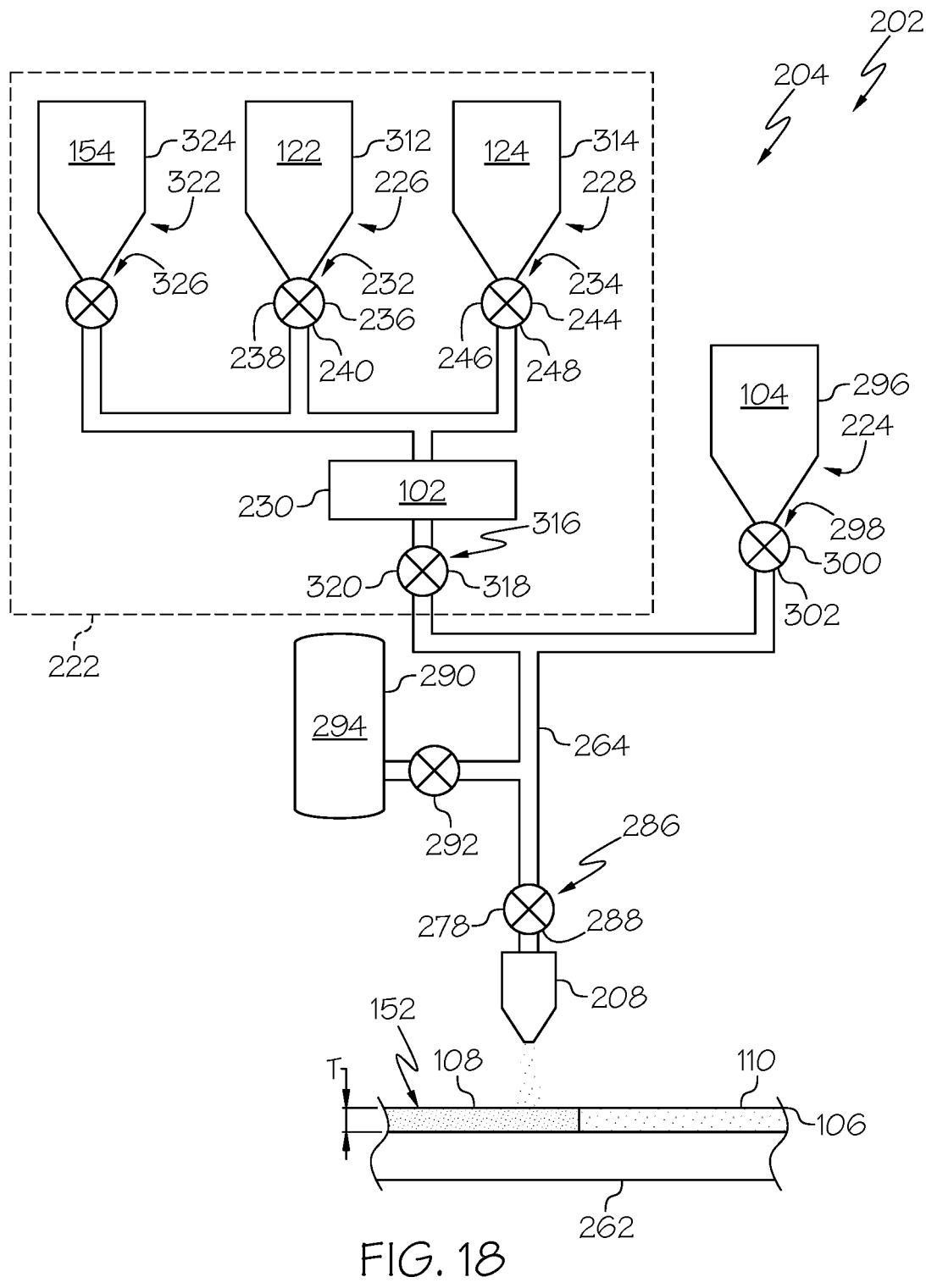
FIG. 18 is a schematic illustration of an example of the powder sprayer of the additive manufacturing system.

FIG. 17 illustrates an example of the compositional ratio of a percentage of the build-powder first constituent 122 and a percentage of the build-powder second constituent 124 of the build powder 102 forming the powder gradient 152 in the build-powder section 108 of an example of the powder layer 106. In the illustrative example of the powder gradient 152, a first portion of the build-powder section 108 of the powder layer 106 includes the build powder 102 having a first build-powder composition, for example, that includes 100% of the build-powder second constituent 124 and 0% of the build-powder first constituent 122. A second portion of the build-powder section 108 includes the build powder 102 having a second build powder composition, for example, that includes 0% of the build-powder second constituent 124 and 100% of the build-powder first constituent 122. A gradient portion of the build-powder section 108 between the first section and the second section forms a compositional gradient zone that transitions between the first build-powder composition and the second build-powder composition in one axial direction.

Distribution of the build-powder first constituent 122 and the build-powder second constituent 124 is not limited to the illustrated example. In other examples, the powder gradient 152 may have any other compositional distribution in one or more axial directions. Accordingly, the object layer 134, formed by joining the build powder 102 of the build-powder section 108 of the powder layer 106 having the powder gradient 152, includes a compositional gradient in one or more axial directions that corresponds to the powder gradient 152. Additionally, in various examples, the powder gradient 152 is formed by the compositional ratio of a percentage of any number (e.g., two or more) of build-powder constituents.

The illustrative example depicts one powder layer of a plurality of successive powder layers that are joined to form a plurality of object layers of the object 100. In one or more examples, the powder gradient 152 of each one of the plurality of powder layers is the same, such that the composition of the object 100 is substantially the same through its thickness. In these examples, the object 100 may have a compositional gradient along the X-axis and/or the Y-axis. In one or more examples, the powder gradient 152 of one or more of the plurality of powder layers is different, such that the composition of the object 100 varies throughout its thickness. In these examples, the object 100 may have a compositional gradient along the X-axis and/or the Y-axis and the Z-axis.

In one or more examples, the build-powder section 108 of each one of the powder layers is composed on only one build powder constituent, however, the build powder constituent varies among the successive powder layers. In these examples, the object 100 may have a compositional gradient along the Z-axis.

Referring to FIG. 18, in one or more examples, the powder sprayer 204 is configured to selectively vary the build-powder composition of the build powder 102 to achieve the powder gradient 152 within the build-powder section 108 of the powder layer 106. In one or more examples, the build-powder feeder 222 includes a build-powder first constituent feeder 226 and a build-powder second constituent feeder 228. The build-powder first constituent feeder 226 is configured to selectively dispense the build-powder first constituent 122. The build-powder second constituent feeder 228 is configured to selectively dispense the build-powder second constituent 124.

The build-powder feeder 222 also includes a mixer 230. The mixer 230 is in volumetric communication with the build-powder first constituent feeder 226 and with the build-powder second constituent feeder 228 such that the build-powder first constituent 122 and the build-powder second constituent 124 are transferred to the mixer 230. In one or more examples, the mixer 230 is coupled to the build-powder first constituent feeder 226 and to the build-powder second constituent feeder 228 via the feed line 264. The mixer 230 is configured to mix the build-powder first constituent 122 and the build-powder second constituent 124 together to form the build powder 102 having a predetermined build-powder composition. The mixer 230 is also configured to contain the build powder 102 and selectively dispense the build powder 102 to the nozzle 208.

In one or more examples, according to the method 1000, the step of (block 1008) selectively controlling the compositional ratio of the build-powder first constituent 122 and the build-powder second constituent 124 includes a step of selectively dispensing a first mass of the build-powder first constituent 122 and a step of selectively dispensing a second mass of the build-powder second constituent 124. Selectively dispensing a predetermined mass of each one of the build-powder first constituent 122 and the build-powder second constituent 124 provides the build powder 102 having a predetermined (e.g., desired) build-powder composition.

In one or more examples, the build-powder first constituent feeder 226 and the build-powder second constituent feeder 228 are gravity fed such that the build-powder first constituent 122 and the build-powder second constituent 124 are dispensed by force of gravity. In one or more examples, the build-powder first constituent feeder 226 and the build-powder second constituent feeder 228 are drive fed such that the build-powder first constituent 122 and the build-powder second constituent 124 are dispensed by force of a propellant or by force of an actuator.

The build-powder first constituent feeder 226 is configured to hold the build-powder first constituent 122 and to selectively dispense the build-powder first constituent 122 to the mixer 230. In one or more examples, the build-powder first constituent feeder 226 includes a build-powder first constituent hopper 312 and a build-powder first constituent regulator 232. The build-powder first constituent hopper 312 includes any suitable structure that is configured to store and dispense the build-powder first constituent 122. The build-powder first constituent regulator 232 is configured to selectively dispense the build-powder first constituent 122 from the build-powder first constituent hopper 312 to the mixer 230, for example, via the feed line 264.

The build-powder first constituent regulator 232 includes any type of regulator suitable for selectively controlling a flow of the build-powder first constituent 122 dispensed from the build-powder first constituent hopper 312. In one or more examples, the build-powder first constituent regulator 232 is configured to selectively control the amounts of the build-powder first constituent 122 dispensed from the build-powder first constituent hopper 312. As such, the build-powder first constituent regulator 232 is capable of suppling the mixer 230 with the build-powder first constituent 122 based on system requirements.

In one or more examples, the build-powder first constituent regulator 232 includes a build-powder first constituent valve 236. The build-powder first constituent valve 236 is configured to regulate the flow of the build-powder first constituent 122 from the build-powder first constituent hopper 312. The build-powder first constituent valve 236 is configured to be selectively open or selectively closed. In one or more examples, the build-powder first constituent valve 236 is a butterfly valve.

In one or more examples, the build-powder first constituent regulator 232 includes a build-powder first constituent mass sensor 238. The build-powder first constituent mass sensor 238 is configured to measure the first mass of the build-powder first constituent 122 passing through the build-powder first constituent regulator 232. In one or more examples, the build-powder first constituent mass sensor 238 provides in-line measurements such that the amount of the build-powder first constituent 122 passing through the build-powder first constituent valve 236 can be accurately measured.

In one or more examples, the amount of the build-powder first constituent 122 passing through the build-powder first constituent regulator 232 can be adjusted as required. In one or more examples, control of the build-powder first constituent regulator 232 is performed manually. In one or more examples, control of the build-powder first constituent regulator 232 is performed automatically, such as via control signals received from the controller 250 (FIGS. 2-5).

In one or more examples, the build-powder first constituent regulator 232 is actively controlled under direction from the controller 250 to selectively dispense a predetermined amount of the build-powder first constituent 122 according to a predetermined plan stored in the controller 250. In one or more examples, the build-powder first constituent valve 236 is an electronic valve that is in communication with and is controlled by the controller 250. In one or more examples, the build-powder first constituent mass sensor 238 is in communication with the controller 250.

The amount of the build-powder first constituent 122 dispensed from the build-powder first constituent feeder 226 is determined based on a number of known parameters and values. In one or more examples, the amount of the build-powder first constituent 122 to be dispensed from the build-powder first constituent feeder 226 is based on a volume of the build-powder first constituent 122 needed to form the build-powder section 108 of the powder layer 106 and a density of the build-powder first constituent 122.

In one or more examples, the amount of the build-powder first constituent 122 to be dispensed from the build-powder first constituent feeder 226 is based on a selected area to be covered by the build powder 102 (e.g., at a selected one of the first locations), a layer thickness (T) of the powder layer 106, an average particle size of the build-powder first constituent 122, an average particle density of the build-powder first constituent 122, and a percent composition of the build-powder first constituent 122 in the build powder 102. From these parameters, the first mass of the build-powder first constituent 122 needed to form the build-powder section 108 or a selected portion of the build-powder section 108 at a given one of the first locations can be determined. Once the predetermined first mass of the build-powder first constituent 122 is dispensed from the build-powder first constituent hopper 312, as measured by the build-powder first constituent mass sensor 238, the build-powder first constituent valve 236 is selectively closed under direction from the controller 250.

The build-powder second constituent feeder 228 is configured to hold the build-powder second constituent 124 and to selectively dispense the build-powder second constituent 124 to the mixer 230. In one or more examples, the build-powder second constituent feeder 228 includes a build-powder second constituent hopper 314 and a build-powder second constituent regulator 234. The build-powder second constituent hopper 314 includes any suitable structure that is configured to store and dispense the build-powder second constituent 124. The build-powder second constituent regulator 234 is configured to selectively dispense the build-powder second constituent 124 from the build-powder second constituent hopper 314 to the mixer 230, for example, via the feed line 264.

The build-powder second constituent regulator 234 includes any type of regulator suitable for selectively controlling a flow of the build-powder second constituent 124 dispensed from the build-powder second constituent hopper 314. In one or more examples, the build-powder second constituent regulator 234 is configured to selectively control the amounts of the build-powder second constituent 124 dispensed from the build-powder second constituent hopper 314. As such, the build-powder second constituent regulator 234 is capable of suppling the mixer 230 with the build-powder second constituent 124 based on system requirements.

In one or more examples, the build-powder second constituent regulator 234 includes a build-powder second constituent valve 244. The build-powder second constituent valve 244 is configured to regulate the flow of the build-powder second constituent 124 from the build-powder second constituent hopper 314. The build-powder second constituent valve 244 is configured to be selectively open or selectively closed. In one or more examples, the build-powder second constituent valve 244 is a butterfly valve.

In one or more examples, the build-powder second constituent regulator 234 includes a build-powder second constituent mass sensor 246. The build-powder second constituent mass sensor 246 is configured to measure the second mass of the build-powder second constituent 124 passing through the build-powder second constituent regulator 234. In one or more examples, the build-powder second constituent mass sensor 246 provides in-line measurements such that the amount of the build-powder second constituent 124 passing through the build-powder second constituent valve 244 can be accurately measured.

In one or more examples, the amount of the build-powder second constituent 124 passing through the build-powder second constituent regulator 234 can be adjusted as required. In one or more examples, control of the build-powder second constituent regulator 234 is performed manually. In one or more examples, control of the build-powder second constituent regulator 234 is performed automatically, such as via control signals received from the controller 250 (FIGS. 2-5).

In one or more examples, the build-powder second constituent regulator 234 is actively controlled under direction from the controller 250 to selectively dispense a predetermined amount of the build-powder second constituent 124 according to a predetermined plan stored in the controller 250. In one or more examples, the build-powder second constituent valve 244 is an electronic valve that is in communication with and is controlled by the controller 250. In one or more examples, the build-powder second constituent mass sensor 246 is in communication with the controller 250.

The amount of the build-powder second constituent 124 dispensed from the build-powder second constituent feeder 228 is determined based on a number of known parameters and values. In one or more examples, the amount of the build-powder second constituent 124 to be dispensed from the build-powder second constituent feeder 228 is based on a volume of the build-powder second constituent 124 needed to form the build-powder section 108 of the powder layer 106 and a density of the build-powder second constituent 124.

In one or more examples, the amount of the build-powder second constituent 124 to be dispensed from the build-powder second constituent feeder 228 is based on a selected area to be covered by the build powder 102 (e.g., at a selected one of the first locations), a layer thickness (T) of the powder layer 106, an average particle size of the build-powder second constituent 124, an average particle density of the build-powder second constituent 124, and a percent composition of the build-powder second constituent 124 in the build powder 102. From these parameters, the second mass of the build-powder second constituent 124 needed to form the build-powder section 108 or a selected portion of the build-powder section 108 at a given one of the first locations can be determined. Once the predetermined second mass of the build-powder second constituent 124 is dispensed from the build-powder second constituent hopper 314, as measured by the build-powder second constituent mass sensor 246, the build-powder second constituent valve 244 is selectively closed under direction from the controller 250.

In one or more examples, the step of (block 1008) selectively controlling the compositional ratio of the build-powder first constituent 122 and the build-powder second constituent 124 also includes a step of monitoring the mass of the build powder 102 formed by the predetermined and selectively controlled compositional ratio of the build-powder first constituent 122 and the build-powder second constituent 124. Monitoring the mass of the build powder 102 formed by the build-powder first constituent 122 and the build-powder second constituent 124 serves as a quality control measure that verifies whether the actual build-powder composition of the build powder 102 is equal to or is within an allowable tolerance of the desired (e.g., predetermined) build-powder composition of the build powder 102.

As illustrated in FIG. 18, in one or more examples, the build-powder feeder 222 includes a mixer regulator 316. The mixer regulator 316 is configured to selectively dispense the build powder 102 to the nozzle 208. In one or more examples, the mixer regulator 316 includes a mixer valve 318. The mixer valve 318 is configured to regulate the flow of the build powder 102 to the nozzle 208. The mixer valve 318 is configured to be selectively open or selectively closed. In one or more examples, the mixer valve 318 is a butterfly valve. In one or more examples, the mixer valve 318 is an electronic valve that is in communication with and is controlled by the controller 250.

In one or more examples, the mixer regulator 316 includes a mixer mass sensor 320. The mixer mass sensor 320 is configured to measure the mass of the build powder 102 passing through the mixer regulator 316. In one or more examples, the mixer mass sensor 320 provides in-line measurements such that the mass of the build powder 102 passing through the mixer valve 318 can be accurately measured. In one or more examples, the mixer mass sensor 320 is in communication with the controller 250.

In one or more examples, the mass of the build powder 102 formed by the build-powder first constituent 122 and the build-powder second constituent 124, as measured by the mixer mass sensor 320, is provided to the controller 250 (FIGS. 2-5), which monitors the mass of the build powder 102 being dispensed from the mixer 230. When a measured mass of the build powder 102, having the actual build-powder composition, deviates from the desired (e.g., predetermined) mass of the build powder 102, having the predetermined build-powder composition, a selected one of the build-powder first constituent regulator 232 or the build-powder second constituent regulator 234 selectively dispenses, under direction from the controller 250, an additional mass of one of the build-powder first constituent 122 or the build-powder second constituent 124 to adjust the build-powder composition of the build powder 102 such that measured mass of the build powder 102 and the desired mass of the build powder 102 are equal or are within an allowable tolerance.

In one or more examples, the step of (block 1008) selectively controlling the compositional ratio of the build-powder first constituent 122 and the build-powder second constituent 124 also includes a step of selectively controlling a first mass flow rate of the build-powder first constituent 122 and a step of selectively controlling a second mass flow rate of the build-powder second constituent 124. Selectively dispensing each one of the build-powder first constituent 122 and the build-powder second constituent 124 at a predetermined mass flow rate provides the build powder 102 having the predetermined (e.g., desired) build-powder composition and serves as another quality control measure that ensures the actual build-powder composition of the build powder 102 is equal to or is within an allowable tolerance of the desired (e.g., predetermined) build-powder composition of the build powder 102.

As illustrated in FIG. 18, in one or more examples, the build-powder first constituent regulator 232 includes a build-powder first constituent mass flow sensor 240. The build-powder first constituent mass flow sensor 240 is configured to measure the first mass flow rate of the build-powder first constituent 122 passing through the build-powder first constituent regulator 232. In one or more examples, the build-powder first constituent mass flow sensor 240 provides in-line measurements such that the first mass flow rate of the build-powder first constituent 122 passing through the build-powder first constituent valve 236 can be accurately measured.

The first mass flow rate of the build-powder first constituent 122 delivered through the build-powder first constituent regulator 232 and, thus, dispensed from the build-powder first constituent feeder 226 is determined based on a number of known parameters and values. In one or more examples, the first mass flow rate of the build-powder first constituent 122 to be dispensed from the build-powder first constituent feeder 226 is based on the first mass of the build-powder first constituent 122, a volume of the build-powder first constituent 122 needed to form the build-powder section 108 of the powder layer 106, a density of the build-powder first constituent 122, a size of the build-powder first constituent valve 236, and a time duration.

In one or more examples, the first mass flow rate of the build-powder first constituent 122 to be dispensed from the build-powder first constituent feeder 226 is based on the first mass of the build-powder first constituent 122 needed for the desired build-powder composition of the build powder 102, the selected area to be covered by the build powder 102 (e.g., at a selected one of the first locations), the layer thickness (T) of the powder layer 106, the average particle size of the build-powder first constituent 122, the average particle density of the build-powder first constituent 122, a volume of an exit orifice of the build-powder first constituent valve 236, and a time required to dispense the first mass of the build-powder first constituent 122. From these parameters, the first mass flow rate of the build-powder first constituent 122 needed to achieve the desired build-powder composition of the build powder 102 to form the build-powder section 108, or a selected portion of the build-powder section 108 at a given one of the first locations, can be determined. During discharge of the build-powder first constituent 122 from the build-powder first constituent regulator 232, the controller 250 monitors the mass flow rate of the build-powder first constituent 122, as measured by the build-powder first constituent mass flow sensor 240. When a measured mass flow rate of the build-powder first constituent 122 deviates from a predetermined mass flow rate of the build-powder first constituent 122, the build-powder first constituent valve 236 is selectively partially opened or selectively partially closed under direction from the controller 250, for example, to adjust the volume of the exit orifice of the build-powder first constituent valve 236, such that the measured mass flow rate of the build-powder first constituent 122 and the predetermined mass flow rate of the build-powder first constituent 122 are equal or are within an allowable tolerance.

In one or more examples, the build-powder second constituent regulator 234 includes a build-powder second constituent mass flow sensor 248. The build-powder second constituent mass flow sensor 248 is configured to measure the second mass flow rate of the build-powder first constituent 122 passing through the build-powder second constituent regulator 234. In one or more examples, the build-powder second constituent mass flow sensor 248 provides in-line measurements such that the second mass flow rate of the build-powder second constituent 124 passing through the build-powder second constituent valve 244 can be accurately measured.

The second mass flow rate of the build-powder second constituent 124 delivered through the build-powder second constituent regulator 234 and, thus, dispensed from the build-powder second constituent feeder 228 is determined based on a number of known parameters and values. In one or more examples, the second mass flow rate of the build-powder second constituent 124 to be dispensed from the build-powder second constituent feeder 228 is based on the second mass of the build-powder second constituent 124, a volume of the build-powder second constituent 124 needed to form the build-powder section 108 of the powder layer 106, a density of the build-powder second constituent 124, a size of the build-powder second constituent valve 244, and a time duration.

In one or more examples, the second mass flow rate of the build-powder second constituent 124 to be dispensed from the build-powder second constituent feeder 228 is based on the second mass of the build-powder second constituent 124 needed for the desired build-powder composition of the build powder 102, the selected area to be covered by the build powder 102 (e.g., at a selected one of the first locations), the layer thickness (T) of the powder layer 106, the average particle size of the build-powder second constituent 124, the average particle density of the build-powder second constituent 124, a volume of an exit orifice of the build-powder second constituent valve 244, and a time required to dispense the second mass of the build-powder second constituent 124. From these parameters, the second mass flow rate of the build-powder second constituent 124 needed to achieve the desired build-powder composition of the build powder 102 to form the build-powder section 108, or a selected portion of the build-powder section 108 at a given one of the first locations, can be determined. During discharge of the build-powder second constituent 124 from the build-powder second constituent regulator 234, the controller 250 monitors the mass flow rate of the build-powder second constituent 124, as measured by the build-powder second constituent mass flow sensor 248. When a measured mass flow rate of the build-powder second constituent 124 deviates from a predetermined mass flow rate of the build-powder second constituent 124, the build-powder second constituent valve 244 is selectively partially opened or selectively partially closed under direction from the controller 250, for example, to adjust the volume of the exit orifice of the build-powder second constituent valve 244, such that the measured mass flow rate of the build-powder second constituent 124 and the predetermined mass flow rate of the build-powder second constituent 124 are equal or are within an allowable tolerance.

Accordingly, the mass flow rates of the build-powder first constituent 122 and the build-powder second constituent 124 can be adjusted as required. In one or more examples, control of the build-powder first constituent regulator 232 and the build-powder second constituent regulator 234 is performed manually. In one or more examples, control of the build-powder first constituent regulator 232 and the build-powder second constituent regulator 234 is performed automatically, such as via control signals received from the controller 250 (FIGS. 2-5). In one or more examples, the build-powder first constituent regulator 232 and the build-powder second constituent regulator 234 are actively controlled by the controller 250 to selectively dispense the build-powder first constituent 122 and the build-powder second constituent 124 at predetermined mass flow rates according to a predetermined plan stored in the controller 250. In one or more examples, the build-powder first constituent valve 236 and build-powder second constituent valve 244 are electronic valves in communication with and controlled by the controller 250. In one or more examples, the build-powder first constituent mass flow sensor 240 and the build-powder second constituent mass flow sensor 248 are in communication with the controller 250.

As expressed above, in one or more examples, the discharge regulator 286 is configured to selectively control the rates at which the build powder 102, formed by the mixture of the build-powder first constituent 122 and the build-powder second constituent 124, is delivered through the nozzle 208 to form the build-powder section 108 of the powder layer 106.

Accordingly, the combination of measuring and selectively controlling the mass and the mass flow rate at the same time provides real-time control over the build-powder composition of the build powder 102 and deposition of the build powder 102 to form the build-powder section 108 of the powder layer 106. In one or more example implementations of the additive manufacturing system 200 and the method 1000, a desired layer thickness (T) of the powder layer 106 and the percent composition of each build-powder constituent (e.g., the build-powder first constituent 122 and the build-powder second constituent 124) is provided as inputs to the controller 250. For a given powder gradient 152, the percent composition of each build-powder constituent at a start point of a preprogrammed tool path of the powder sprayer 204 (e.g., the first build-powder composition) and the percent composition of each build-powder constituent at an end point of the preprogrammed tool path of the powder sprayer 204 (e.g., the second build-powder composition) are provided as inputs to the controller 250. The controller 250 is configured to mathematically iterate for a plurality of points between the start point and the end point to provide the percent composition of each build-powder constituent through the gradient zone during deposition of the build powder 102.

In one or more examples, the constituent masses of the each one of the build-powder constituents (e.g., the first mass of the build-powder first constituent 122 and the second mass of the build-powder second constituent 124) are known values per their unique material densities. In one or more examples, the material densities of the various build-powder constituents are stored in a material lookup table that is accessible by the controller 250. The mass of the build powder 102 is measured prior to deposition to determine an average density of the resultant mixture of the build-powder constituents (e.g., the build-powder first constituent 122 and the build-powder second constituent 124). Based on the measured mass of the build powder 102, the actual build-powder composition of the build powder 102 can be adjusted electronically in real-time to reach the desired (e.g., predetermined) build-powder composition. The mass per unit volume of each one of the build-powder constituents is a known value based on average particle size and an exit volume at a discharge point (e.g., at the discharge regulator 286 or the nozzle 208) is also a known value. The mass flow rate of the build powder 102 is measured during deposition. A feedback loop is used by the controller 250 to iterate on the process parameters when the measured mass flow rate of the build powder 102 does not correlate 1:1 with the average particle density such that the controller 250 automatically adjusts the amounts of the build-powder constituents (e.g., the build-powder first constituent 122 and the build-powder second constituent 124) to achieve the desired build-powder composition.

As such, the controller 250 utilizes machine learning or artificial intelligence to actively control the build-powder composition of the build powder 102 as the build powder 102 is being deposited to form the build-powder section 108 of the powder layer 106. Such active control also serves as quality control. Through use of the controller 250, an automated and iterative process is performed, for example, using the lookup tables, to determine both optimized build parameters and material compositions at any moment in time and/or at any point in the build of each one of the object layers.

Accordingly, in one or more examples, the controller 250 is a feedback controller that uses sensor data, for example, from the various mass sensors and mass flow sensors, and a feedback control algorithm to generate a number of commands to control the build-powder composition and the rate of deposition of the build powder 102. For example, verification of the mass through real-time computational iterations and adjustments in the analytical model and equations, executed by the controller 250, serve as continuous quality control checks of the intended composition of the build powder 102.

Combinations of varying parameters create an iterative multivariable feedback algorithm utilized by the controller 250. By way of example, the controller 250 may employ one or more of the following relationships during execution of the feedback control algorithm.

$$M_{fp}=(\rho_p * V_e)/t$$

$M_{fp}$ is the mass flow rate of the particles of the powder at an exit orifice.

$\rho_p$ is the average density of the particles of the powder.

$V_e$ is the volume at an exit, or discharge, orifice for the powder.

t is time.

In an example, the mass flow rate of the build powder 102 corresponds to the mass flow rate of the particles of the build powder 102 at the exit (e.g., discharge) orifice of the nozzle 208 or of the discharge regulator 286. In another example, the mass flow rate of any one of the build-powder constituents corresponds to the mass flow rate of the particles of the build-powder constituent at the exit (e.g., discharge) orifice of the build-powder constituent regulator associated with the build-powder constituent.

In one or more examples, the average density of the particles ($\rho_p$) is determined based on the percent composition of the build-powder constituents forming the powder.

$$\rho_p = (\% \ Wt_{m1} * \rho_{m1}) + [1 - (\% \ Wt_{m1}) * \rho_{m2}]$$

$\% \ Wt_{m1}$ is the weight percentage of a first one of the build-powder constituents forming the powder (e.g., the build-powder first constituent 122).

$\rho_{m1}$ is the average density of the particles of a first one of the build-powder constituents forming the powder (e.g., the build-powder first constituent 122).

$\rho_{m2}$ is the average density of the particles of a second one of the build-powder constituents forming the powder (e.g., the build-powder second constituent 124).

The illustrative examples depict the build powder 102 formed by a mixture of two build-powder constituents (e.g., the build-powder first constituent 122 and the build-powder second constituent 124) and, as such, the powder gradient 152 includes a gradient zone that varies the percent composition of the two build-powder constituents. In other examples, the build powder 102 is formed by two or more build-powder constituents and, as such, the powder gradient 152 includes a gradient zone that varies the percent composition of the two or more build-powder constituents.

Referring to FIG. 18, in one or more examples, the build powder 102 includes a mixture of the build-powder first constituent 122, the build-powder second constituent 124, and any number of build-powder additional constituents 154. As such, the powder sprayer 204 includes any number of build-powder additional constituent feeders 322 that deliver the number of build-powder additional constituents 154 to the mixer 230. Each one of the number of build-powder additional constituent feeders 322 includes a build-powder additional constituent hopper 324 and a build-powder additional constituent regulator 326 that perform the function as described above.

As such, the average density of the particles ($\rho_p$) used by the feedback control algorithm is scalable to account for the number of build-powder additional constituents 154.

As such, for three build-powder constituents, the average density is calculated by:

$$\rho_p = (\% \ Wt_{m1} * \rho_{m1}) + [1-(\% \ Wt_{m1} + \% \ Wt_{m3}) * \rho_{m2}] + [1-(\% \ Wt_{m1} + \% \ Wt_{m2}) * \rho_{m3}].$$

$\% \ Wt_{m3}$ is the weight percentage of a third one of the build-powder constituents forming the powder (e.g., one or the build-powder additional constituents 154).

$\rho_{m3}$ is the average density of the particles of a third one of the build-powder constituents forming the powder (e.g., one of the build-powder additional constituents 154).

This same scaling procedure can be applied for any number of build-powder constituents that is required or desired for any composition of the build powder 102.

Referring to FIG. 1, the operational steps of depositing-and-joining the powder for the method 1000 may be repeated a number of times form a plurality of successive powder layers, to produce a plurality of successive object layers, and to, ultimately, form the object 100 (block 1010).

In one or more examples, the method 1000 includes a step of selectively depositing the build powder 102 inside of a second build contour 132 of the object 100 to form a second build-powder section 128 of a second powder layer 126. The method 1000 also includes a step of selectively depositing the support powder 104 outside of the second build contour 132 to form a second support-powder section 130 of the second powder layer 126. The method 1000 further includes a step of joining the build powder 102 of the second build-powder section 128 of the second powder layer 126 to form the second object layer 148.

Referring to FIGS. 12 and 13, in one or more examples, the powder-deposition apparatus 202 (FIGS. 2-5), such as the powder sprayer 204 (FIGS. 14, 15 and 18), is configured to selectively deposit the build powder 102 inside of the second build contour 132 to form the second build-powder section 128 of the powder layer 106. The powder-deposition apparatus 202 (FIGS. 2-5), such as the powder sprayer 204 (FIGS. 14, 15 and 18) and/or the recoater 206 (FIG. 16), is configured to selectively deposit the support powder 104 outside of the second build contour 132 to form the second support-powder section 130 of the second powder layer 126. In one or more examples, the powder-joining apparatus 212, such as the directed energy device 252 (FIG. 10) or the binder-delivery device 254 (FIG. 11), is configured to join the build powder 102 of the second build-powder section 128 of the second powder layer 126 to form the second object layer 148.

In one or more examples, the build powder 102 and the support powder 104 are deposited to form the second powder layer 126 in a manner that is substantially the same as that described herein above with respect to the powder layer 106. In one or more examples, the build powder 102 of the second powder layer 126 is joined to form the second object layer 148 in a manner that is substantially the same as that described herein above with respect to the object layer 134.

In one or more examples, as illustrated in FIGS. 12 and 13, the build contour 112 of the powder layer 106 and the second build contour 132 of the second powder layer 126 are the same. As such, the object contour 146 of the object layer 134 and a second object contour 150 of the second object layer 148 are the same. In these examples, the second object layer 148 is unitarily joined to the object layer 134 that was previously formed and that underlies the second object layer 148.

Referring to FIGS. 19-22, in one or more examples, the build contour 112 and the second build contour 132 are different. As such, the object contour 146 of the object layer 134 and the second object contour 150 of the second object layer 148 are different.

According to the method 1000, in one or more examples, the step of selectively depositing the build powder 102 inside of the second build contour 132 situates a first portion of the second build-powder section 128 of the second powder layer 126 on the previously formed and underlying object layer 134 and situates a second portion of the second build-powder section 128 of the second powder layer 126 on the previously formed and underlying support-powder section 110 of the powder layer 106. In these examples, examples, the first portion of the second object layer 148 is unitarily joined to the object layer 134 that was previously formed and that underlies the first portion of second object layer 148 and the second portion of the second object layer 148 is supported by the underlying support-powder section 110 of the powder layer 106.

Figure 19:
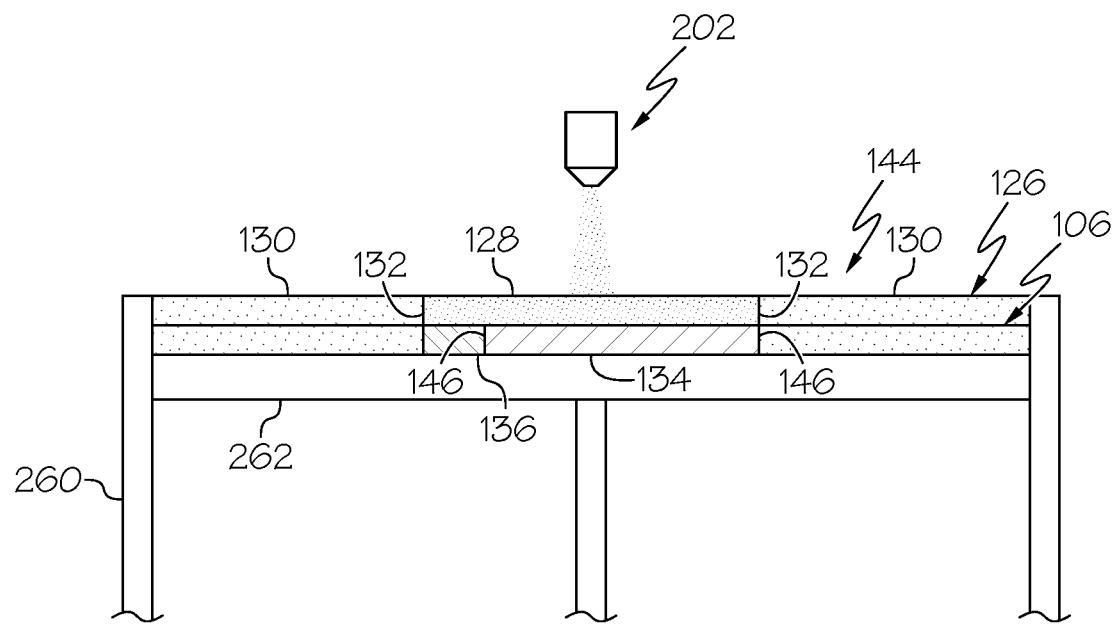
FIG. 19 is a schematic illustration of an example of the second powder layer formed on the underlying powder layer, object layer, and support layer.
Figure 20:
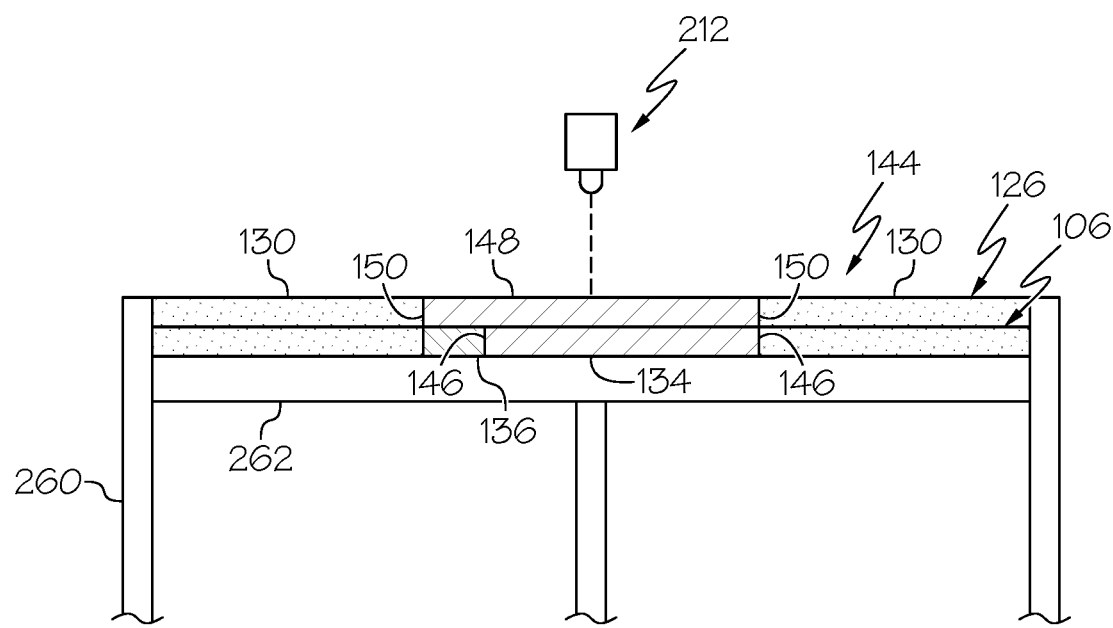
FIG. 20 is a schematic illustration of an example of the second object layer formed on the underlying object layer and support layer.

In one or more examples, the support powder 104 of the support-powder section 110 of the powder layer 106 may not be capable of adequately supporting the second portion of the second object layer 148. With reference to FIGS. 19 and 20, in one or more examples, the method 1000 includes a step of (block 1012) consolidating the support powder 104 of a portion of the support-powder section 110 of the powder layer 106 to form a support layer 136. According to the method 1000, in one or more examples, the step of selectively depositing the build powder 102 inside of the second build contour 132 situates the second portion of the second build-powder section 128 of the second powder layer 126 on the previously formed and underlying support layer 136 and the first portion of the second build-powder section 128 of the second powder layer 126 on the previously formed and underlying object layer 134. In these examples, the first portion of the second object layer 148 is unitarily joined to the object layer 134 that was previously formed and that underlies the first portion of second object layer 148 and the second portion of the second object layer 148 is supported by the underlying support layer 136. The support layer 136 advantageously provides a stable, solid structure capable of adequately supporting the second portion of the second object layer 148.

Figure 21:
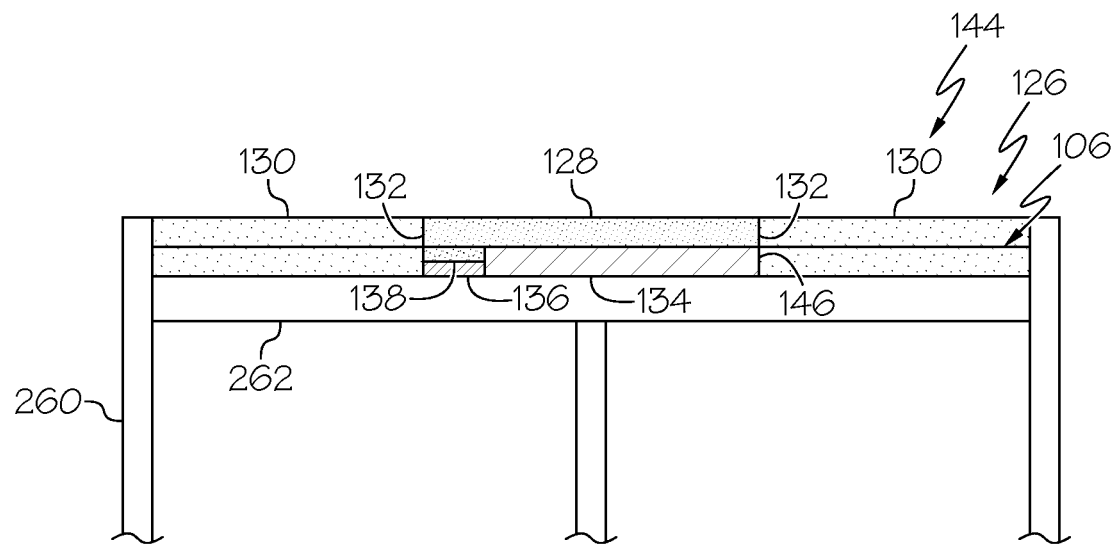
FIG. 21 is a schematic illustration of an example of the second powder layer formed on the underlying powder layer, object layer, and intermediate support-powder layer.
Figure 22:
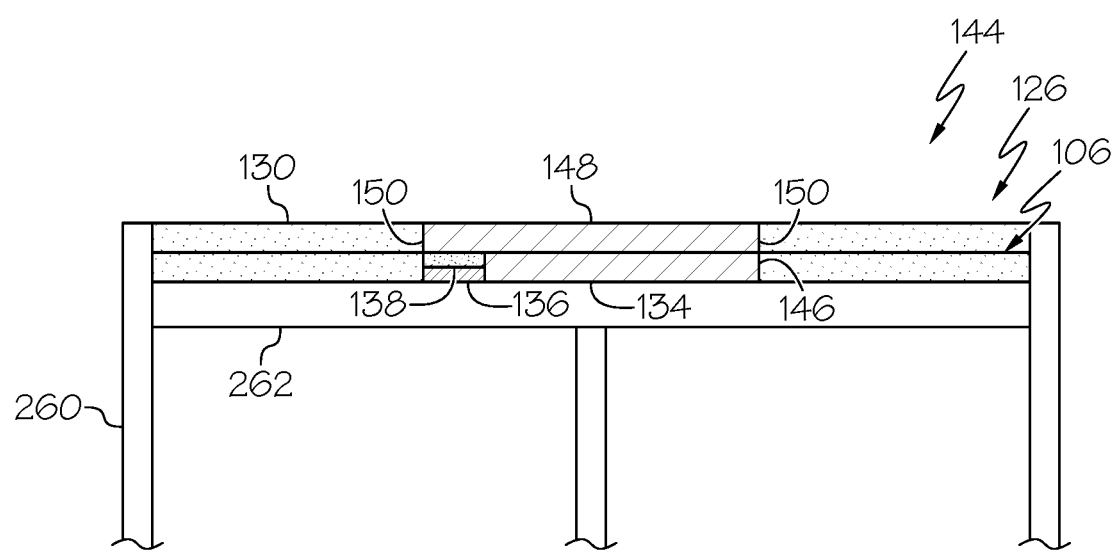
FIG. 22 is a schematic illustration of an example of the second object layer formed on the underlying object layer and intermediate support-powder layer.

In one or more examples, it may be advantageous to prevent the second portion of the second object layer 148 from becoming joined with the previously formed and underlying support layer 136. With reference to FIGS. 21 and 22, in one or more examples, the method 1000 includes a step of (block 1014) selectively depositing the support powder 104 inside the second build contour 132 to form an intermediate support-powder layer 138 on the support layer 136. Accordingly, the step of selectively depositing the support powder 104 inside the second build contour 132 to form the intermediate support-powder layer 138 precedes the step of selectively depositing the build powder 102 inside of the second build contour 132 to form the second build-powder section 128 of the second powder layer 126. According to the method 1000, the step of selectively depositing the support powder 104 inside of the second build contour 132 situates the intermediate support-powder layer 138 on the support layer 136. The step of selectively depositing the build powder 102 inside of the second build contour 132 situates the second portion of the second build-powder section 128 of the second powder layer 126 on the previously formed and underlying intermediate support-powder layer 138 and the first portion of the second build-powder section 128 of the second powder layer 126 on the previously formed and underlying object layer 134. In these examples, the first portion of the second object layer 148 is unitarily joined to the object layer 134 that was previously formed and that underlies the first portion of second object layer 148 and the second portion of the second object layer 148 is supported by a combination of the underlying support layer 136 and intermediate support-powder layer 138. The intermediate support-powder layer 138 advantageously prevents the second portion of the second object layer 148 from becoming joined with the previously formed and underlying support layer 136.

In one or more examples, a layer thickness of the intermediate support-powder layer 138 is a fraction of the layer thickness of a given powder layer. As such, the support layer 136 provides structural support to a portion of a successive, overlying object layer and the intermediate support-powder layer 138 provides a buffer between the object layer and the support layer 136 without altering the build shape of the object 100.

According to the method 1000, in one or more examples, the step of (block 1008) selectively controlling the build-powder composition of the build powder 102 is applicable to the forming the second build-powder section 128 of the second powder layer 126. For example, the step of (block 1008) selectively controlling the build-powder composition of the build powder 102 and the step of selectively depositing the build powder 102 occur concurrently. In one or more examples, the build-powder composition of build powder 102 used to form the second build-powder section 128 of the second powder layer 126 is controlled in a manner that is substantially the same as that described herein above with respect to the build-powder section 108 of the powder layer 106.

Accordingly, in one or more examples, implementations of the additive manufacturing system 200 and method 1000 are used to form a plurality of powder layers in which at least one of the plurality of powder layers has a compositional gradient. In one or more examples, implementations of the additive manufacturing system 200 and method 1000 are used to form a plurality of cross-sectional object layers of the object 100 in which at least one of the plurality of object layer has a compositional gradient. In one or more examples, implementations of the additive manufacturing system 200 and method 1000 are used to make the object 100 in which the object 100 has a compositional gradient.

In one or more examples, the composition gradient within a given powder layer and, thus, the compositional gradient within a given object layer and the compositional gradient of the object 100 are controlled under direction from the controller 250 according to a predetermined plan stored in the controller 250.

Referring to FIG. 1, in one or more examples, the method 1000 includes a step of (block 1016) determining property-data for the object 100. In one or more examples, the property-data represents a two-dimensional distribution of at least one desired material property of the object 100 corresponding to a two-dimensional cross-sectional layer of the object 100. For example, the property-data is acquired from a three-dimensional model representing the distribution of the at least one desired material property of the object 100, which is converted into a two-dimensional layer. In one or more examples, the property data represents a three-dimensional distribution of the at least one desired material property of the object 100. For example, the property-data is acquired from the three-dimensional model representing the distribution of the at least one desired material property of the object 100, which is converted into a plurality of two-dimensional layers. In one or more examples, the method 1000 includes a step of (block 1018) determining, or generating, composition-data for the build-powder section of each one of a plurality of powder layers deposited to form the object 100. In one or more examples, the composition-data represents a two-dimensional distribution of the build-powder composition of the build-powder section of the powder layer. The two-dimensional distribution of the build-powder composition is mapped to the two-dimensional distribution of the at least one material property of the object 100. In these examples, the step of (block 1008) selectively controlling the compositional ratio of the build powder 102 includes a step of adjusting the compositional ratio of the number of build-powder constituents according to the two-dimensional distribution of the build-powder composition of the build-powder section of the powder layer. In one or more examples, the composition-data represents a three-dimensional distribution of the build-powder composition of the build-powder section of the plurality of powder layers deposited to form the object 100. The three-dimensional distribution of the build-powder composition is mapped to the three-dimensional distribution of the at least one material property of the object 100. In these examples, the step of (block 1008) selectively controlling the compositional ratio of the build powder 102 includes a step of adjusting the compositional ratio of the number of build-powder constituents according to the three-dimensional distribution of the build-powder composition of the build-powder section of the plurality of powder layers. The at least one desired material property of the object 100 includes, but is not limited to, a desired physical property, chemical property, electrical property, thermal property, and/or magnetic property within a given object layer or within the object 100.

The present disclosure recognizes that, in certain applications of powder bed additive manufacturing, it may be advantageous to reduce the area of a powder layer or the volume of the powder bed. Accordingly, one or more examples of the additive manufacturing system 200 and the method 1000 provide techniques to reduce the area of the powder layer or the volume of the powder bed, which results in a reduction in the amount of powder needed to form the powder layer, a reduction in cost, a reduction in cycle time, and an increase in process efficiency.

Referring to FIG. 1, in one or more examples, the method 1000 includes a step of (block 1020) forming a barrier 142. The barrier 142 is configured to contain the powder layer 106. According to the method 1000, in one or more examples, the barrier 142 includes a closed cross-section that is configured to surround the build contour 112 of the powder layer 106. In one or more examples, the barrier 142 is situated at a location that will be outside of, such as around, the build contour 112. In one or more examples, the barrier 142 forms at least a portion of the build contour 112.

Figure 24:
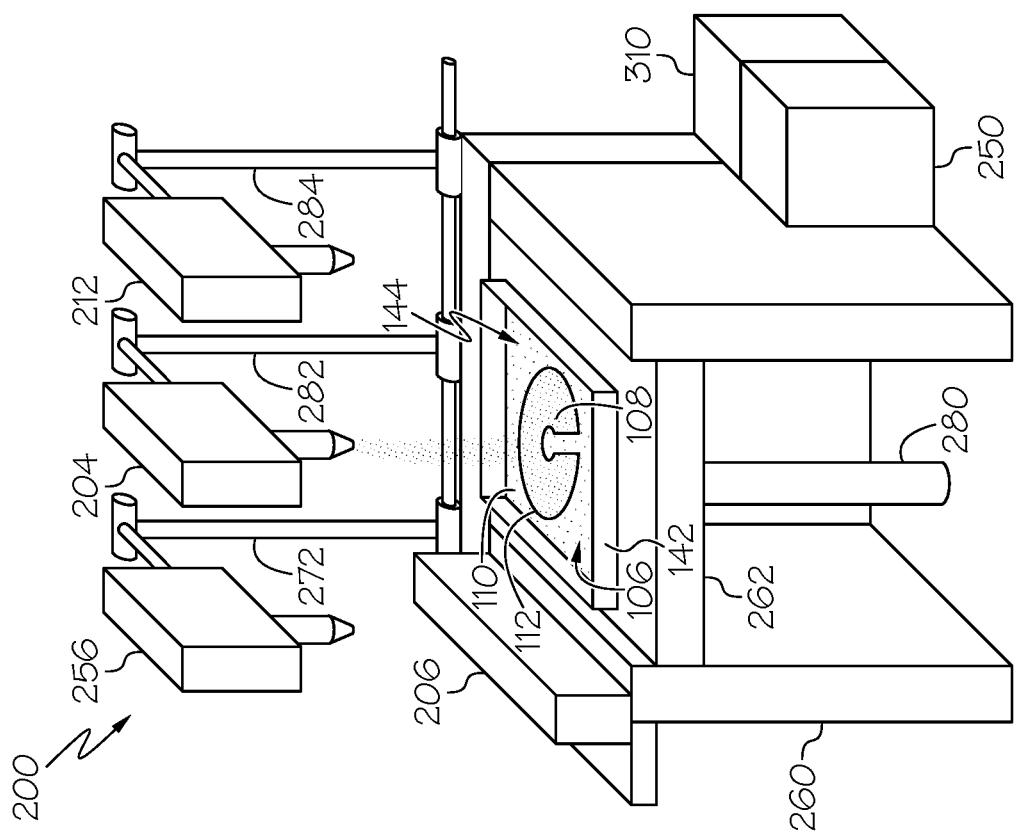
FIG. 24 is a schematic illustration of an example of the additive manufacturing system, in which the powder layer is formed inside the barrier.
Figure 23:
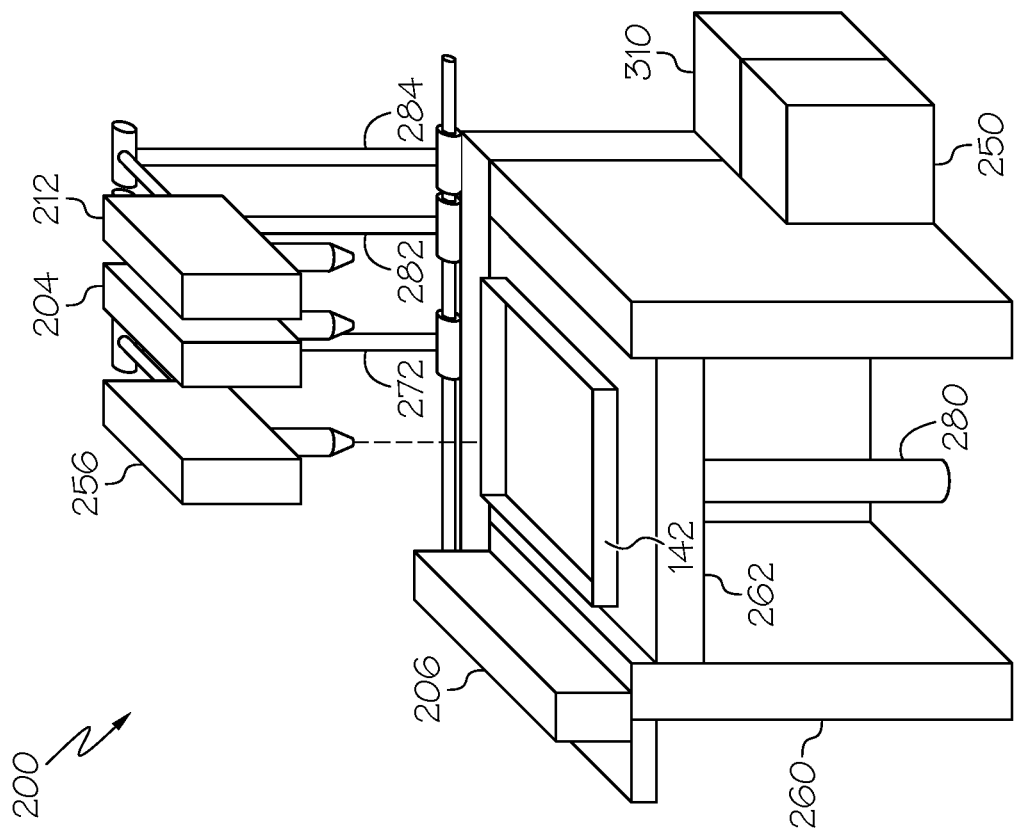
FIG. 23 is a schematic illustration of an example of the additive manufacturing system, in which a barrier is formed.

Referring to FIGS. 23 and 24, in one or more examples, the additive manufacturing system 200 includes a barrier-formation apparatus 256. The barrier-formation apparatus 256 is configured to form the barrier 142. In one or more examples, the barrier 142 is formed on the build platform 262. The powder layer 106 is formed inside of the barrier 142. In other words, the barrier 142 provides a peripheral boundary to the powder layer 106. In one or more examples, In one or more examples, the step of (block 1020) forming the barrier 142 precedes the steps of (block 1002) selectively depositing the build powder 102 to form the build-powder section 108 of the powder layer 106 and the step of (block 1004) selectively depositing the support powder 104 to form the support-powder section 110 of the powder layer 106.

In one or more examples, the powder layer 106 is formed by depositing the build powder 102 and the support powder 104, as described herein above, within a perimeter formed by the barrier 142. In these examples, the powder layer 106, made up of the support powder 104 (the support-powder section 110) and the build powder 102 (the build-powder section 108), is located inside of and is bound by the barrier 142. In these examples, the support-powder section 110 of the powder layer 106 is situated between the barrier 142 and the build contour 112. Accordingly, use of the barrier 142 reduces the area of the powder layer 106 and, more particularly, reduces the area of the support-powder section 110 of the powder layer 106.

Alternatively, in one or more examples, the powder layer 106 is formed by depositing only the build powder 102, as described herein above, within the perimeter formed by the barrier 142. In these examples, the powder layer 106, made up of only build powder 102, is located inside of and is bound by the barrier 142. Accordingly, use of the barrier 142 reduces the area of the powder layer 106 and enables an entirety of the powder layer 106 to be formed of the build powder 102 while reducing an unused amount of the build powder 102 that may be wasted or that requires recycling.

In one or more examples, the barrier-formation apparatus 256 is movable relative to the build platform 262. In one or more examples, the barrier-formation apparatus 256 moves vertically (e.g., is raised) relative to the build platform 262 as successive layers of the object 100 are formed. In one or more examples, the barrier-formation apparatus 256 moves horizontally relative to the build platform 262 as the barrier 142 is formed. In one or more examples, the barrier-formation apparatus 256 has multiple degrees of freedom to accommodate multi-axis movement for forming the barrier 142 at any location on the build platform 262.

In one or more examples, the additive manufacturing system 200 includes a barrier-formation actuator 272 coupled to the barrier-formation apparatus 256 and configured to drive movement of the barrier-formation apparatus 256. In one or more examples, the barrier-formation actuator 272 includes, or takes the form of, a linear actuator, a robotic actuator arm (e.g., a six-axis robotic actuator arm), and the like.

Figure 25:
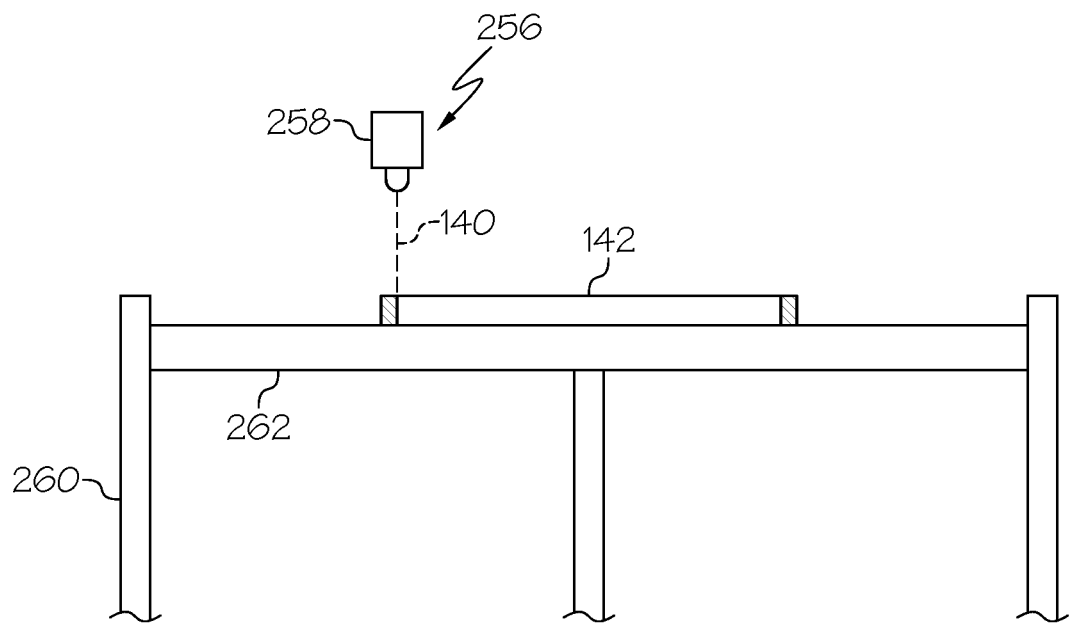
FIG. 25 is a schematic illustration of an example of the barrier formed by depositing wire.
Figure 26:
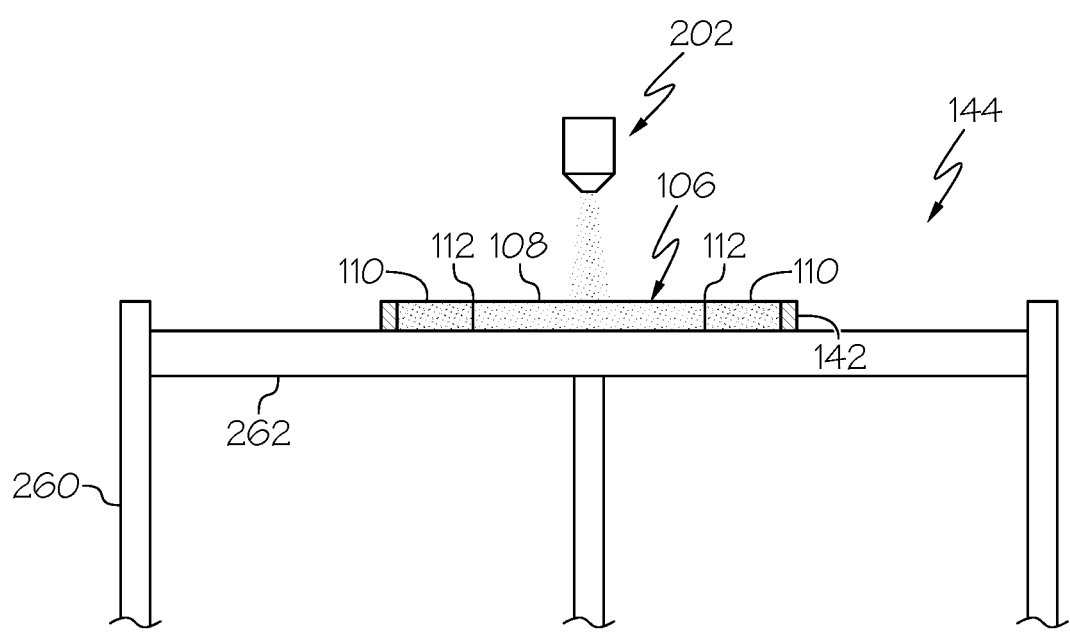
FIG. 26 is a schematic illustration of an example of the powder layer formed inside the barrier.

In one or more examples, the step of (block 1020) forming the barrier 142 includes a step of selectively depositing wire 140 to form the barrier 142. Accordingly, as illustrated in FIGS. 25 and 26, in one or more examples, the barrier-formation apparatus 256 includes a wire-deposition device 258. The wire-deposition device 258 is configured to dispense, or feed, the wire 140 onto a growth surface while directing an energy beam onto the growth surface to melt the wire 140 and form a liquid melt-pool. The wire-deposition device 258 is moved across the growth surface while feeding the wire 140 into the melt-pool to form the barrier 142, under direction from the controller 250. When forming the barrier 142 associated with the powder layer 106 (e.g., the initial powder layer), the growth surface is the surface of the build platform 262.

The wire-deposition device 258 includes any suitable energetic additive manufacturing device with wire feed. In one or more examples, the wire-deposition device 258 includes a wire feeder, configured to dispense the wire 140, and a directed energy device (e.g., a laser), configured to generate and emit an energy beam (e.g., laser beam) to form the melt-pool.

The wire 140 includes any solid wire material that is suitable to be fed and melted into the melt-pool to build up the barrier 142 in a layerwise manner. Examples of the wire 140 include, but are not limited to, metallic wire, metallic allow wire, polymeric wire, and the like.

Upon formation of the powder layer 106 within the barrier 142, the build powder 102 is joined to form the object layer 134 as described herein above. This forming-and-joining process is repeated a number of times to form a plurality successive barrier layers (a plurality of layers of the barrier 142), to form a plurality of successive powder layers, to form a plurality of successive object layers, and to, ultimately, form the object 100. Following formation of each one of the object layers, a successive layer of the barrier 142 is formed on a previously formed and underlying layer of the barrier 142 before forming the successive powder layer. When forming a successive layer of the barrier 142 associated with a successive powder layer, the growth surface is the surface of previously formed and underlying layer of the barrier 142.

Figure 27:
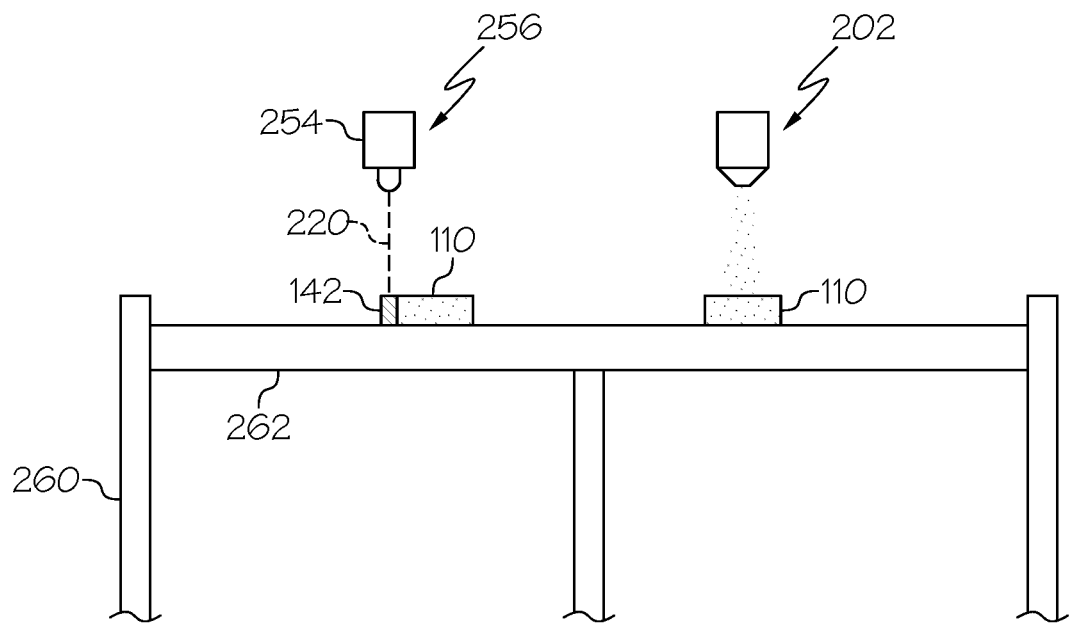
FIG. 27 is a schematic illustration of an example of the barrier formed by bonding the support powder.
Figure 28:
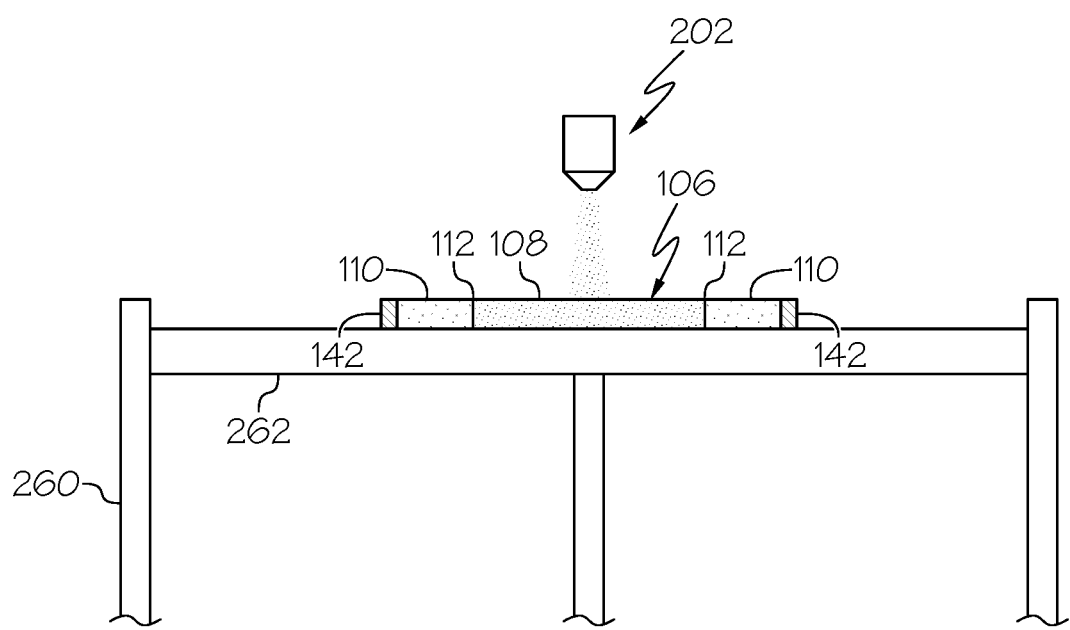
FIG. 28 is a schematic illustration of an example of the powder layer formed inside the barrier.

In one or more examples, the step of (block 1020) forming the barrier 142 includes a step of joining the support powder 104 of a selected portion of the support-powder section 110 of the powder layer 106 to form the barrier 142. In one or more examples, the step of joining the support powder 104 includes a step of bonding the support powder 104 of the selected portion of the support-powder section 110, for example, using the binder 220. Accordingly, as illustrated in FIGS. 27 and 28, in one or more examples, the barrier-formation apparatus 256 includes the binder-delivery device 254. The binder-delivery device 254 is configured to deposit the binder 220 on the support powder 104. The binder 220 is suitable to bond the support powder 104 of the selected portion of the support-powder section 110 of the powder layer 106 to form a solid layer of the barrier 142.

In one or more examples, the support powder 104 is deposited to form at least a portion of the support-powder section 110 of the powder layer 106, for example, using the powder-deposition apparatus 202 as described herein above. The support powder 104 of the selected portion of the support-powder section 110 is bonded via the binder 220 to form the barrier 142 using the binder-delivery device 254. Following formation of the barrier 142, the build powder 102 is deposited to form the build-powder section 108 of the powder layer 106, for example, using the powder-deposition apparatus 202 as described herein above. Upon formation of the powder layer 106 within the barrier 142, the build powder 102 is joined to form the object layer 134 as described herein above. This forming-and-joining process is repeated a number of times to form a plurality successive barrier layers (a plurality of layers of the barrier 142), to form a plurality of successive powder layers, to form a plurality of successive object layers, and to, ultimately, form the object 100. Following formation of each one of the object layers, a successive layer of the barrier 142 is formed on a previously formed and underlying layer of the barrier 142 before forming the successive powder layer.

Throughout the present disclosure, examples of the operational steps of the method 1000 and components of the additive manufacturing system 200 described with respect to depositing the build powder 102 to form the build-powder section 108 of the powder layer 106, depositing the support powder 104 to form the support-powder section 110 of the powder layer 106, and joining the build powder 102 to form the object layer 134 are equally applicable to operational steps and components for depositing the build powder 102 to form the second build-powder section 128 of the second powder layer 126, depositing the support powder 104 to form the second support-powder section 130 of the second powder layer 126, and joining the build powder 102 to form the second object layer 148, as well as being equally applicable to forming a number of successive powder layers and forming a number of successive object layers. Furthermore, additional components, such as additional powder-feeders, regulators, nozzles, directed energy devices, and the like may be included in the additive manufacturing system 200 without departing from the scope of the present disclosure.

As described herein, the controller 250 communicates with and/or controls various components of the additive manufacturing system 200. In one or more examples, the controller 250 is a computing device that includes a processor and memory. The memory may be a computer-readable memory medium and is configured to store data required for operation of the additive manufacturing system 200. Computer-readable memory medium is any medium which can be used to store information which can later be accessed by the processor. Computer-readable memory medium may include computer memory and data storage devices. Computer memory may be a fast-access memory and may be used to run program instructions executable by the processor. Computer memory may include random access memory (RAM), flash memory, and read-only memory (ROM). Data storage devices may be physical devices and may be used to store any information or computer program which may be accessed by the processor, such as an operating system, computer programs, program modules, and program data. Data storage devices and their associated computer-readable memory media provide storage of computer-readable instructions, data structures, program modules, and other data for the system. Data storage devices may include magnetic medium like a floppy disk, a hard disk drive, and magnetic tape; an optical medium like a Compact Disc (CD), a Digital Video Disk (DVD), and a Blu-ray Disc; and solid state memory such as random access memory (RAM), flash memory, and read only memory (ROM).

In one or more examples, the memory includes data packets comprised of data required for controlled operation of the additive manufacturing system 200. For example, one data packet may contain data required for control of the powder-deposition apparatus 202 and another data packet may contain data required for control of the powder-joining apparatus. The processor communicates with the memory to retrieve the necessary data for controlling operation of the additive manufacturing system 200.

In one or more examples, the subject matter of the present disclosure is described with reference to acts and symbolic representations of operations that are performed by one or more computers or computer systems, unless indicated otherwise. As such, it will be understood that such acts and operations, which are at times referred to as being computer-executed, include the manipulation by one or more processors of the additive manufacturing system 200, such as of the controller 250, via electrical signals representing data in a structured form. This manipulation transforms the data or maintains it at specific locations in the memory of the additive manufacturing system 200, which reconfigures or otherwise alters the operation of the additive manufacturing system 200 in a manner well understood by those skilled in the art. The data structures where data is maintained are physical locations of the memory that have particular properties defined by the format of the data. However, although one or more examples are described in the foregoing context, it is not meant to be limiting, as those skilled in the art will appreciate, in that some of the acts and operations described herein may also be implemented in hardware, software, and/or firmware and/or some combination thereof.

Figure 29:
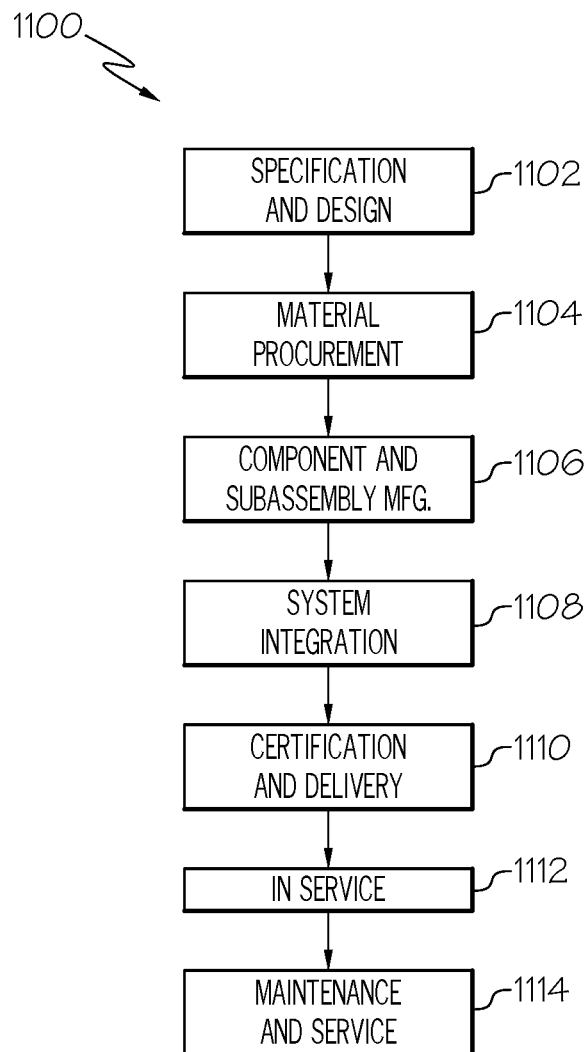
FIG. 29 is a flow diagram of an aircraft manufacturing and service methodology.
Figure 30:
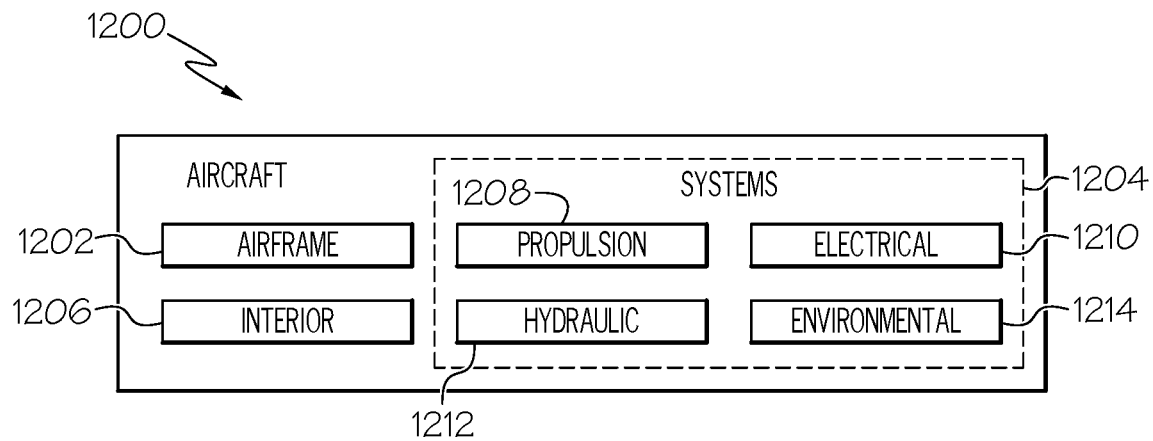
FIG. 30 is a schematic block diagram of an example of an aircraft.

Referring now to FIGS. 29 and 30 examples of the method 1000 and the additive manufacturing system 200 may be used in the context of an aircraft manufacturing and service method 1100, as shown in the flow diagram of FIG. 29 and an aircraft 1200, as schematically illustrated in FIG. 30.

Referring to FIG. 30, in one or more examples, the aircraft 1200 includes an airframe 1202, an interior 1206, and a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a guidance system, and the like. The object 100 made in accordance with the method 1000, and using the additive manufacturing system 200, may be a structure, an assembly, a sub-assembly, a component, a part, or any other portion of the aircraft 1200, such as a portion of the airframe 1202 or the interior 1206.

Referring to FIG. 29 during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 29 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the method 1000 and the additive manufacturing system 200 shown and described herein may be employed during any one or more of the stages of the manufacturing and service method 1100 shown in the flow diagram illustrated by FIG. 29. In an example, implementation of the disclosed the method 1000 and the additive manufacturing system 200 may form a portion of component and subassembly manufacturing (block 1106) and/or system integration (block 1108). For example, assembly of the aircraft 1200 and/or components thereof using implementations of the disclosed the method 1000 and the additive manufacturing system 200 may correspond to component and subassembly manufacturing (block 1106) and may be prepared in a manner similar to components or subassemblies prepared while the aircraft 1200 is in service (block 1112). Also, implementations of the disclosed the method 1000 and the additive manufacturing system 200 may be utilized during system integration (block 1108) and certification and delivery (block 1110). Similarly, implementations of the disclosed the method 1000 and the additive manufacturing system 200 may be utilized, for example and without limitation, while the aircraft 1200 is in service (block 1112) and during maintenance and service (block 1114).

Although an aerospace (e.g., aircraft or spacecraft) example is shown, the examples and principles disclosed herein may be applied to other industries, such as the automotive industry, the construction industry, the wind turbine industry, the electronics industry, and other design and manufacturing industries. Accordingly, in addition to aircraft and spacecraft, the examples and principles disclosed herein may apply to powder bed additive manufacturing processes used to form objects used with other vehicles (e.g., land vehicles, marine vehicles, construction vehicles, etc.), machinery, and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy. For example, the term "approximately" refers to a condition that is within 10% of the stated condition. However, the term "approximately" does not exclude a condition that is exactly the stated condition.

Those skilled in the art will appreciate that some of the elements, features, and/or components described and illustrated in FIGS. 2-28 and 30, referred to above, may be combined in various ways without the need to include other features described and illustrated in FIGS. 2-28 and 30, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 2-28 and 30, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Additionally, those skilled in the art will appreciate that not all elements described and illustrated in FIGS. 2-28 and 30, referred to above, need be included in every example and not all elements described herein are necessarily depicted in each illustrative example.

In FIGS. 1 and 29, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 1 and 29, referred to above, and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the method 1000 and the additive manufacturing system 200 have been shown and described, modifications may occur to those skilled in the art upon reading the specification. The present application includes such modifications and is limited only by the scope of the claims.

What is claimed is:

1. A method of additively manufacturing an object, the method comprising:
    selectively depositing build powder only inside of a first build contour of the object to form a first build-powder section of a first powder layer;
    selectively depositing support powder only outside of the first build contour to form a first support-powder section of the first powder layer;
    joining the build powder of the first powder layer to form a first object layer;
    joining the support powder of a portion of the first powder layer that is outside of the first build contour and that is inside of a second build contour of the object to form a support layer;
    selectively depositing the support powder inside of the second build contour to form an intermediate support-powder layer on the support layer;
    selectively depositing the build powder only inside of the second build contour of the object to form a second build-powder section of a second powder layer;
    selectively depositing the support powder only outside of the second build contour to form a second support-powder section of the second powder layer; and
    joining the build powder of the second powder layer to form a second object layer such that a portion of the second object layer is joined to the first object layer and another portion of the second object layer is supported on but not joined to the intermediate support-powder layer;
    wherein:
        the build powder comprises a build-powder composition;
        the support powder comprises a support-powder composition; and
        the build-powder composition and the support-powder composition are different.

2. The method of claim 1, wherein selectively depositing the support powder of the first powder layer precedes selectively depositing the build powder of the first powder layer such that:
    a support-powder boundary of the first support-powder section of the first powder layer forms the first build contour; and
    a build-powder boundary of the first build-powder section of the first powder layer abuts the support-powder boundary of the first support-powder section of the first powder layer.

3. The method of claim 1, wherein selectively depositing the build powder of the first powder layer precedes selectively depositing the support powder of the first powder layer such that:
    a build-powder boundary of the first build-powder section of the first powder layer forms the first build contour; and
    a support-powder boundary of the first support-powder section of the first powder layer abuts the build-powder boundary of the first build-powder section of the first powder layer.

4. The method of claim 1, further comprising selectively controlling the build-powder composition of the build powder.

5. The method of claim 4, wherein:
the build powder comprises a mixture of a build-powder first constituent and a build-powder second constituent; and
selectively controlling the build-powder composition of the build powder comprises selectively controlling a compositional ratio of the build-powder first constituent and the build-powder second constituent.

6. The method of claim 5, wherein selectively controlling the compositional ratio of the build-powder first constituent and the build-powder second constituent comprises:
measuring a first mass of the build-powder first constituent;
measuring a second mass of the build-powder second constituent; and
measuring a mass of the build powder, comprising the mixture of the build-powder first constituent and the build-powder second constituent.

7. The method of claim 6, wherein selectively controlling the compositional ratio of the build-powder first constituent and the build-powder second constituent further comprises measuring a mass flow rate of the build powder, comprising the mixture of the build-powder first constituent and the build-powder second constituent.

8. The method of claim 1, further comprising forming a barrier that has a closed cross-section, wherein at least a portion of each of the first powder layer and the second powder layer are bound by the barrier.

9. The method of claim 8, wherein the barrier is formed by depositing wire outside of the first build contour and the second build contour.

10. The method of claim 8, wherein the barrier is formed by delivering binder to the support powder of a portion of the first powder layer outside of the first build contour and delivering binder to the support powder of a portion of the second powder layer outside of the second build contour.

11. The method of claim 1, wherein the support powder is selectively deposited using at least one of a powder sprayer and a powder roller to form the first support-powder section of the first powder layer.

12. The method of claim 1, wherein the build powder is deposited using a sprayer to form the first build-powder section of the first powder layer.

13. The method of claim 1, further comprising selectively varying the build-powder composition of the build powder to achieve at least one of:
a first powder gradient within the first build-powder section of the first powder layer; and
a second powder gradient within the first build-powder section of the first powder layer and the second build-powder section of the second powder layer.

14. A method of additively manufacturing an object, the method comprising:
selectively depositing build powder only inside of a first build contour of the object to form a first build-powder section of a first powder layer;
selectively depositing support powder only outside of the first build contour to form a first support-powder section of the first powder layer;
joining the build powder of the first powder layer to form a first object layer;
joining the support powder of a portion of the first powder layer that is outside of the first build contour and that is inside of a second build contour of the object to form a support layer;
selectively depositing the support powder inside of the second build contour to form an intermediate support-powder layer on the support layer;
selectively depositing the build powder only inside of the second build contour of the object to form a second build-powder section of a second powder layer;
selectively depositing the support powder only outside of the second build contour to form a second support-powder section of the second powder layer; and
joining the build powder of the second powder layer to form a second object layer such that a portion of the second object layer is joined to the first object layer and another portion of the second object layer is supported on but not joined to the intermediate support-powder layer.

15. An additive-manufacturing system comprising:
a powder-deposition apparatus;
a powder-joining apparatus; and
a controller programmed to command the powder-deposition apparatus and the powder-joining apparatus to:
selectively deposit build powder only inside of a first build contour to form a first build-powder section of a first powder layer;
selectively deposit support powder only outside of the first build contour to form a first support-powder section of the first powder layer;
join the build powder of the first powder layer to form a first object layer;
join the support powder of a portion of the first powder layer that is outside of the first build contour and that is inside of a second build contour of the object to form a support layer;
selectively deposit the support powder inside of the second build contour to form an intermediate support-powder layer on the support layer;
selectively deposit the build powder only inside of the second build contour of the object to form a second build-powder section of a second powder layer;
selectively deposit the support powder only outside of the second build contour to form a second support-powder section of the second powder layer; and
join the build powder of the second powder layer to form a second object layer such that a portion of the second object layer is joined to the first object layer and another portion of the second object layer is supported on but not joined to the intermediate support-powder layer.

16. The additive-manufacturing system of claim 15, wherein:
the powder-deposition apparatus comprises a powder sprayer configured to selectively deposit the build powder; and
the powder sprayer comprises:
a build-powder feeder configured to selectively dispense the build powder; and
a nozzle coupled to the build-powder feeder and configured to selectively discharge the build powder.

17. The additive-manufacturing system of claim 16, wherein:
the powder-deposition apparatus comprises a recoater configured to selectively deposit the support powder; and
the recoater comprises:
a support-powder feeder configured to selectively dispense the support powder; and a roller configured to collect the support powder from the support-powder feeder and selectively discharge the support powder.

18. The additive-manufacturing system of claim 16, wherein the powder sprayer is configured to selectively control a build-powder composition of the build powder.

19. The additive-manufacturing system of claim 15, further comprising a wire-deposition device configured to dispense wire to form a barrier, wherein the powder-deposition apparatus is configured to selectively deposit the support powder and the build powder inside the barrier.

20. The additive-manufacturing system of claim 15, wherein:
  the powder-joining apparatus comprises a binder-delivery device configured to selectively deposit binder suitable to bond the support powder of a portion of the first support-powder section of the first powder layer and form a barrier; and
  the powder-deposition apparatus is configured to selectively deposit the build powder of the first powder layer inside the barrier.

* * * * *